United States Patent
Tsuiki et al.

(10) Patent No.: US 10,250,092 B2
(45) Date of Patent: Apr. 2, 2019

(54) ROTARY ELECTRIC MACHINE

(71) Applicant: MITSUBISHI ELECTRIC CORPORATION, Chiyoda-ku, Tokyo (JP)

(72) Inventors: Hironori Tsuiki, Tokyo (JP); Atsushi Sakaue, Tokyo (JP); Hiroyuki Akita, Tokyo (JP); Akira Hashimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 454 days.

(21) Appl. No.: 14/900,466

(22) PCT Filed: Jun. 30, 2014

(86) PCT No.: PCT/JP2014/067367
§ 371 (c)(1),
(2) Date: Dec. 21, 2015

(87) PCT Pub. No.: WO2015/029579
PCT Pub. Date: Mar. 5, 2015

(65) Prior Publication Data
US 2016/0156238 A1    Jun. 2, 2016

(30) Foreign Application Priority Data
Aug. 26, 2013  (JP) ................. 2013-174294

(51) Int. Cl.
*H02K 3/12* (2006.01)
*H02K 3/28* (2006.01)
*H02K 3/38* (2006.01)

(52) U.S. Cl.
CPC ............. *H02K 3/28* (2013.01); *H02K 3/12* (2013.01); *H02K 3/38* (2013.01)

(58) Field of Classification Search
CPC ............... H02K 3/28; H02K 3/12; H02K 3/38
(Continued)

(56) References Cited

U.S. PATENT DOCUMENTS 5,955,804 A *  9/1999  Kusase ................... H02K 3/12
                                              29/596
6,841,913 B2 *  1/2005  Gorohata ................ H02K 3/12
                                              29/596
(Continued)

FOREIGN PATENT DOCUMENTS

CN    102449883 A    5/2012
CN    102638121 A    8/2012
(Continued)

OTHER PUBLICATIONS

International Search Report (PCT/ISA/210) dated Sep. 2, 2014, by the Japanese Patent Office as the International Searching Authority for International Application No. PCT/JP2014/067367.
(Continued)

*Primary Examiner* — Bernard Rojas
*Assistant Examiner* — Ahmed Elnakib
(74) *Attorney, Agent, or Firm* — Buchanan Ingersoll & Rooney PC

(57) ABSTRACT

Winding bodies are configured such that radially inner terminals of a conductor wire extend outward at a first axial end of an armature core from a radially innermost position inside slots, and radially outer terminals of the conductor wire extend outward at the first axial end of the armature core from a radially outermost position inside the slots, and respective phase windings of an armature winding are configured by directly joining together the radially inner terminals and by directly joining together the radially outer terminals of the winding bodies that constitute identical phases.

6 Claims, 20 Drawing Sheets

(58) Field of Classification Search
USPC .......... 310/71, 206, 180, 201, 208, 260, 270
See application file for complete search history.

(56) References Cited

U.S. PATENT DOCUMENTS

| | | | | |
|---|---|---|---|---|
| 7,825,562 | B2* | 11/2010 | Naganawa | H02K 15/063 310/184 |
| 8,884,489 | B2* | 11/2014 | Yamada | H02K 3/12 310/179 |
| 9,859,764 | B2* | 1/2018 | Tsuiki | H02K 3/12 |
| 2004/0256942 | A1* | 12/2004 | Yokoyama | H02K 3/12 310/180 |
| 2005/0258703 | A1* | 11/2005 | Kouda | H02K 3/12 310/180 |
| 2008/0174199 | A1* | 7/2008 | Ishigami | H02K 3/12 310/199 |
| 2011/0198953 | A1* | 8/2011 | Shinohara | H02K 3/12 310/71 |
| 2012/0007460 | A1* | 1/2012 | Kitamura | H02K 3/12 310/195 |
| 2012/0025658 | A1* | 2/2012 | Watanabe | H02K 3/12 310/179 |
| 2012/0181891 | A1* | 7/2012 | Yamada | H02K 3/12 310/201 |
| 2012/0200191 | A1 | 8/2012 | Baba et al. | |
| 2012/0319521 | A1* | 12/2012 | Kimura | H02K 3/34 310/195 |
| 2015/0171690 | A1* | 6/2015 | Yokota | H02K 3/12 310/58 |
| 2016/0056679 | A1* | 2/2016 | Sakaue | H02K 1/16 310/198 |
| 2016/0065026 | A1* | 3/2016 | Nakamura | H02K 3/38 310/207 |
| 2016/0268860 | A1* | 9/2016 | Tsuiki | H02K 3/12 |
| 2017/0237310 | A1* | 8/2017 | Nakamura | H02K 3/50 310/195 |

FOREIGN PATENT DOCUMENTS

| | | |
|---|---|---|
| EP | 0 740 403 A1 | 10/1996 |
| JP | 08-298756 A | 11/1996 |
| JP | 2008-278677 A | 11/2008 |
| JP | 2011-036093 A | 2/2011 |
| JP | 2012-249344 A | 12/2012 |
| JP | 2013-085476 A | 5/2013 |

OTHER PUBLICATIONS

Written Opinion (PCT/ISA/237) dated Sep. 2, 2014, by the Japanese Patent Office as the International Searching Authority for International Application No. PCT/JP2014/067367.

Office Action (First Office Action) dated Jul. 25, 2017, by the Chinese Patent Office in corresponding Chinese Patent Application No. 201480042140.3, and an English Language Text Portion of the First Office Action. (7 pages).

\* cited by examiner

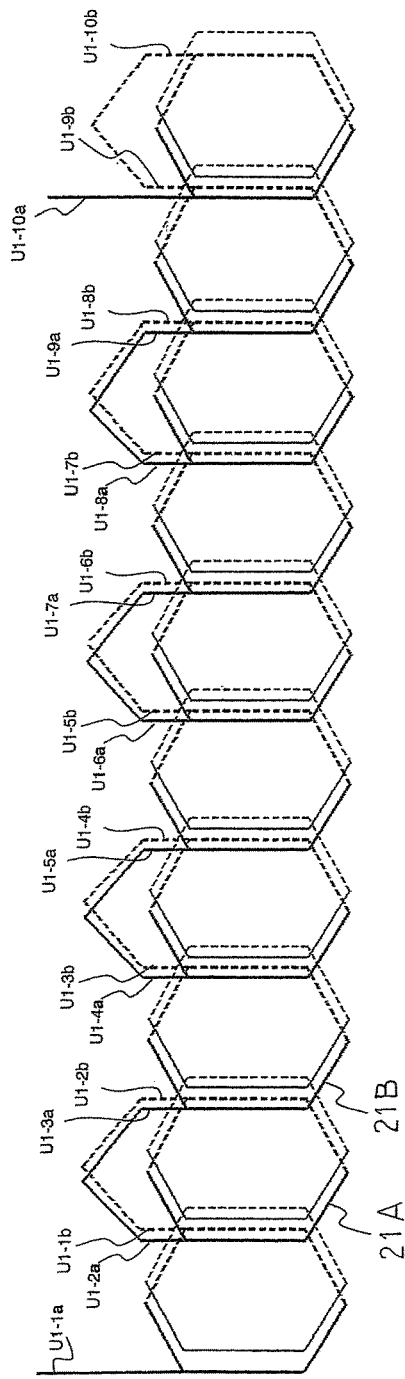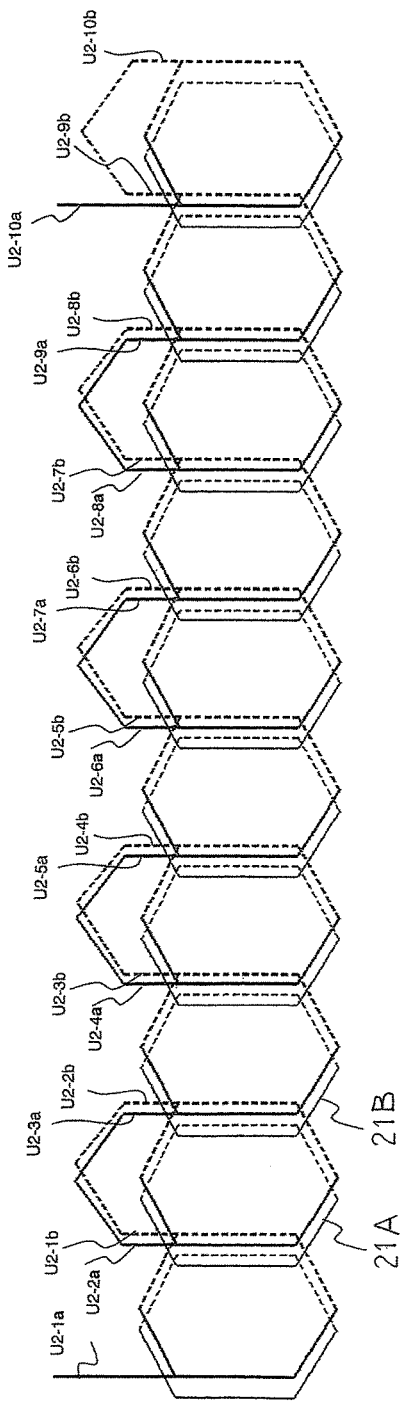
FIG. 18A
FIG. 18B

ROTARY ELECTRIC MACHINE

TECHNICAL FIELD

The present invention relates to a rotary electric machine such as an electric motor or a generator, for example, and particularly relates to a connecting construction for winding bodies that constitute part of an armature winding.

BACKGROUND ART

In recent years, compactness, high output, and high quality have been required in rotary electric machines such as electric motors or generators. With regard to downsizing rotary electric machines of this kind, stator windings that have concentrated windings in which conductor wires are wound onto individual stator core teeth have been used with a view to downsizing coil ends that do not generate effective magnetic flux. However, stators that use stator windings of distributed winding construction that can suppress torque pulsation and increase output are also in demand. In addition, demand for induction machines that do not use magnets has also increased due to steep rises in magnet prices, and there is demand for stators that use higher-efficiency distributed winding stator windings.

The conventional rotary electric machine that is described in Patent Literature 1 includes a plurality of distributed lap-wound winding bodies that are mounted such that conductor terminals that protrude from a radially innermost position inside a first slot and a radially outermost position inside a second slot in slot pairs that span a plurality of teeth, conductor terminals that protrude out of the radially outermost positions inside the slots being bent, passed axially outside the coil end group, and connected to the conductor terminals to which connection is required that protrude out of the radially innermost positions inside the slots, to configure a stator winding.

The conventional rotary electric machine that is described in Patent Literature 2 includes a plurality of distributed lap-wound winding bodies that are mounted such that conductor terminals that protrude from an intermediate position inside a first slot and a radially outermost position inside a second slot in slot pairs that span a plurality of teeth, conductor terminals that protrude out of the intermediate positions inside the slots being passed between coil ends and made to protrude radially outward, and connected to the conductor terminals to which connection is required that protrude out of the radially outermost positions inside the slots using busbars outside a coil end group, to configure a stator winding.

CITATION LIST

Patent Literature

Patent Literature 1: Japanese Patent Laid-Open No. 2011-36093 (Gazette)
Patent Literature 2: Japanese Patent Laid-Open No. 2012-249344 (Gazette)

SUMMARY OF THE INVENTION

Problem to be Solved by the Invention

In Patent Literature 1, because conductor terminals that protrude out of the radially outermost positions inside the slots are connected to conductor terminals that protrude out of the radially innermost positions inside the slots so as to pass axially outside the coil end group, it has been necessary to ensure insulation between the crossover portions of the conductor terminals that pass axially outside the coil end group and the coil end group. Thus, it is necessary to dispose insulating members between the crossover portions of the conductor terminals and the coil end group, or to widen gaps between the crossover portions of the conductor terminals and the coil end group, and one problem has been that the axial length of the stator winding is made proportionately longer, increasing the axial dimensions of the stator. In addition, when the conductor terminals are being bent radially inward in order to pass axially outside the coil end group, another problem has been that the bending radius of the conductor terminals is large, making the axial length of the stator winding proportionately longer, and increasing the axial dimensions of the stator.

In Patent Literature 2, because the conductor terminals protrude radially outward so as to pass between the coil ends, increases in the axial length of the stator winding can be suppressed. However, because the conductor terminals are connected to each other using busbars, one problem has been that the number of parts is increased.

The present invention aims to solve the above problems and an object of the present invention is to provide a rotary electric machine that includes an armature that has reduced axial dimensions and fewer parts, by configuring winding bodies such that conductor terminals extend outward from radially innermost positions and radially outermost positions inside respective slots, and configuring respective phase windings of an armature winding by directly joining together conductor terminals that extend from radially innermost positions, and by directly joining together conductor terminals that extend from radially outermost positions, to eliminate crossover portions that pass over axially outside a coil end group, and to eliminate a need for separate parts such as busbars.

Means for Solving the Problem

A rotary electric machine according to the present invention includes an armature that includes: an annular armature core in which slots are arranged circumferentially; and an armature winding that is mounted to the armature core, wherein: the armature winding is configured by mounting to the armature core at a pitch of one slot in a circumferential direction distributed winding bodies that are each produced by winding a jointless, continuous conductor wire that is coated with insulation for a plurality of turns, the winding bodies being equal in number to a total number of the slots; the winding bodies are configured such that a first conductor terminal of the conductor wire extends outward at a first axial end of the armature core from a radially innermost position inside the slots, and a second conductor terminal of the conductor wire extends outward at the first axial end of the armature core from a radially outermost position inside the slots; and respective phase windings of the armature winding are configured by directly joining together the first conductor terminals and by directly joining together the second conductor terminals of the winding bodies that constitute identical phases.

Effects of the Invention

According to the present invention, winding bodies are configured such that a first conductor terminal of a conductor wire extends outward at a first axial end of an armature core from a radially innermost position inside slots, and a second conductor terminal of the conductor wire extends outward at the first axial end of the armature core from a radially outermost position inside the slots, and respective phase windings of the armature winding are configured by directly joining together the first conductor terminals and by directly joining together the second conductor terminals of the winding bodies that constitute identical phases. Thus, crossover portions that pass over axially outside a coil end group are eliminated, and separate parts such as busbars that connect the first conductor terminals to each other and the second conductor terminal to each other are no longer required, enabling axial dimensions of an armature to be reduced, and also enabling the number of parts to be reduced.

BRIEF DESCRIPTION OF THE DRAWINGS

FIGS. 18A and 18B show connection diagrams for the armature winding in the rotary electric machine according to Embodiment 1 of the present invention;

DESCRIPTION OF EMBODIMENTS

Preferred embodiments of a rotary electric machine according to the present invention will now be explained with reference to the drawings.

Embodiment 1

Figure 1:
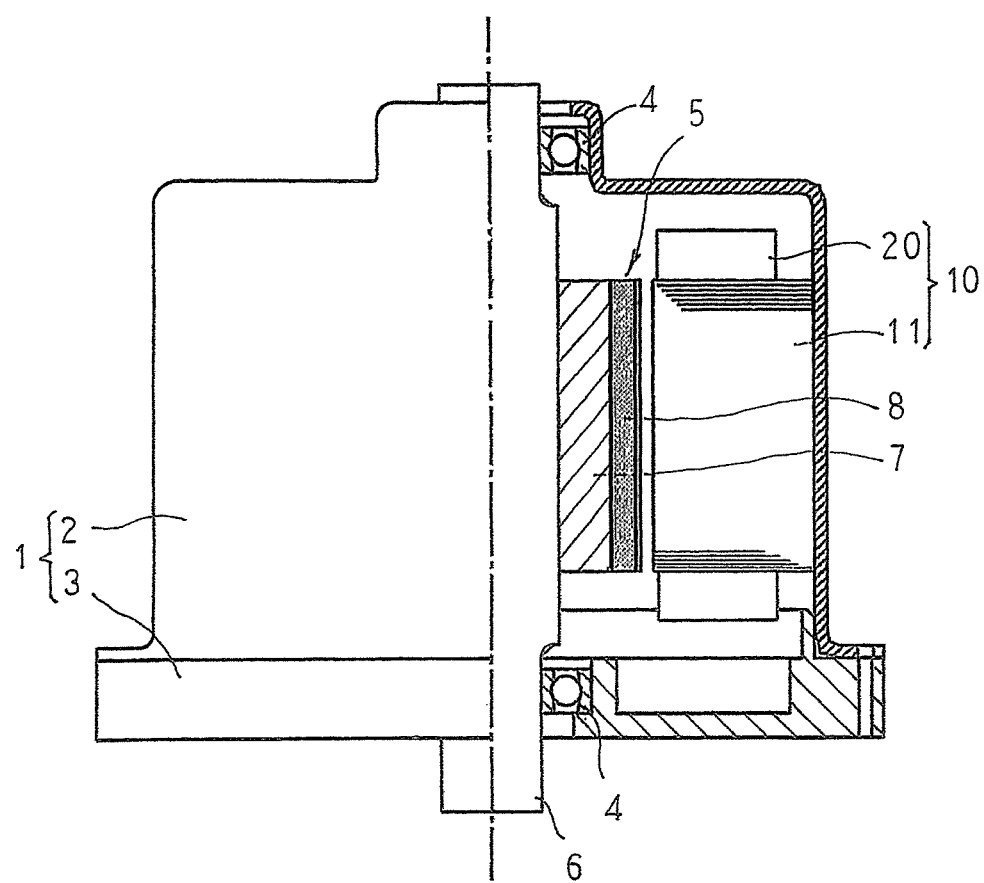
FIG. 1 is a half section that shows a rotary electric machine according to Embodiment 1 of the present invention.
Figure 2:
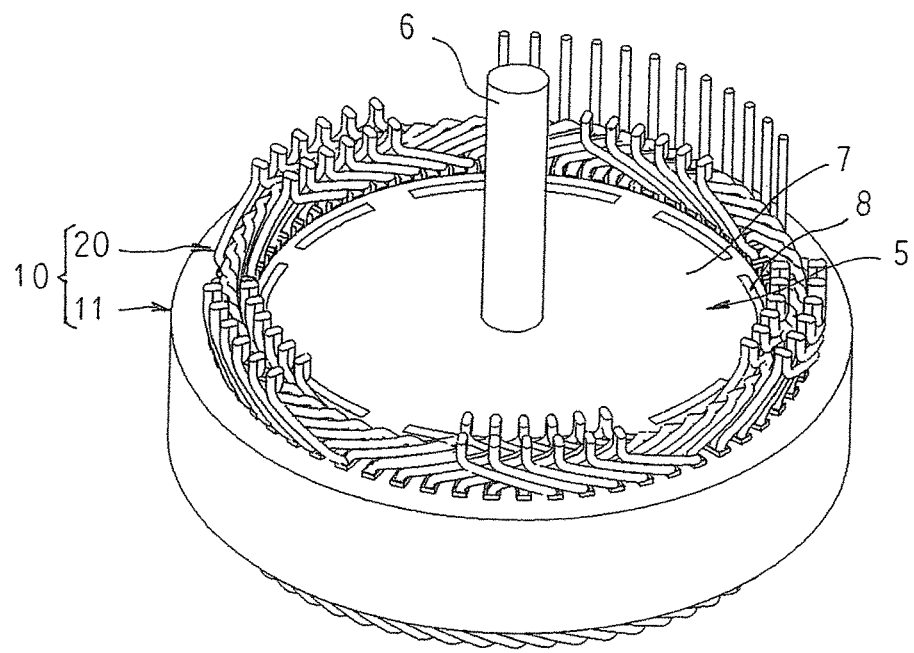
FIG. 2 is an oblique projection that shows part of the rotary electric machine according to Embodiment 1 of the present invention.
Figure 3:
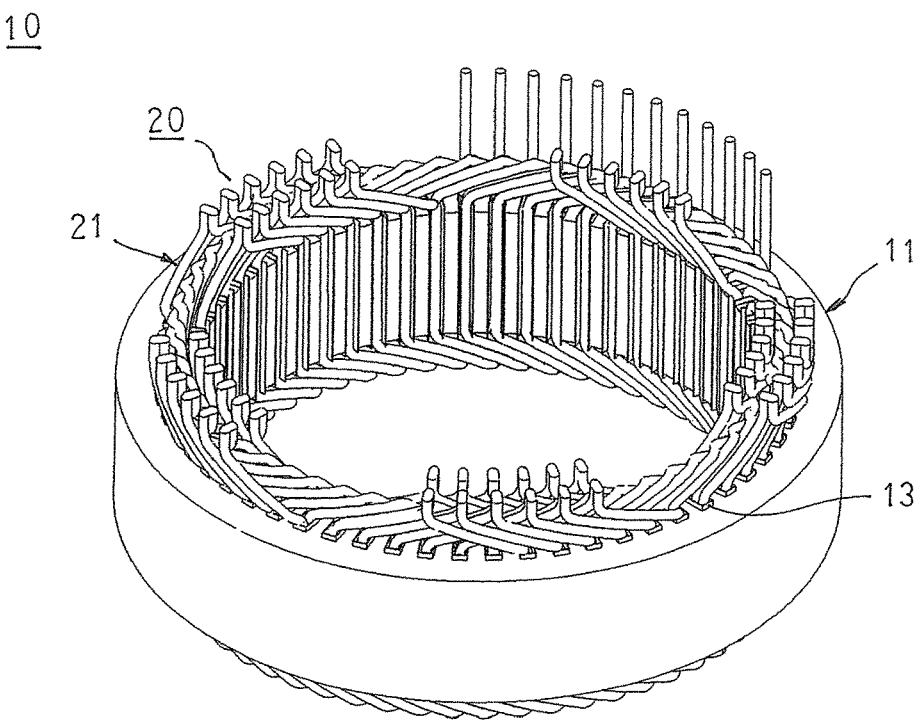
FIG. 3 is an oblique projection that shows an armature that is used in the rotary electric machine according to Embodiment 1 of the present invention.
Figure 4:
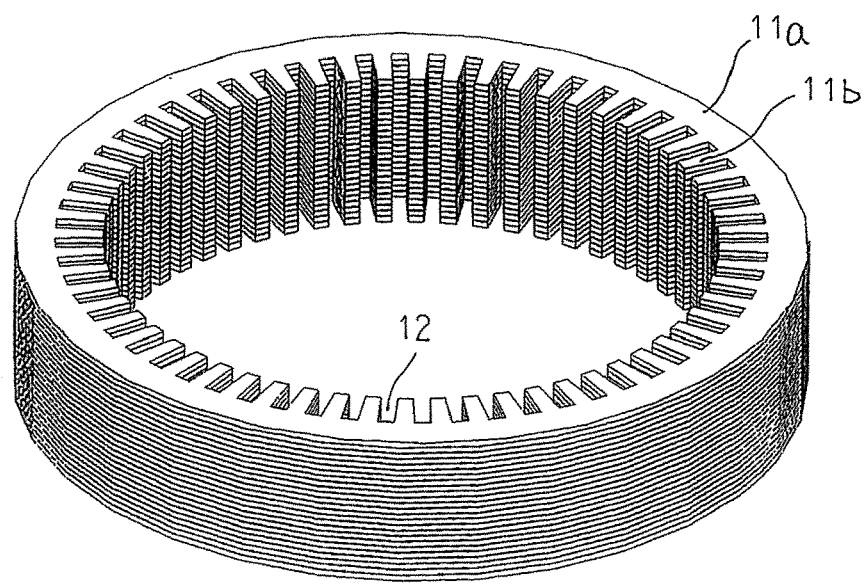
FIG. 4 is an oblique projection that shows an armature stator that is used in the rotary electric machine according to Embodiment 1 of the present invention.
Figure 5:
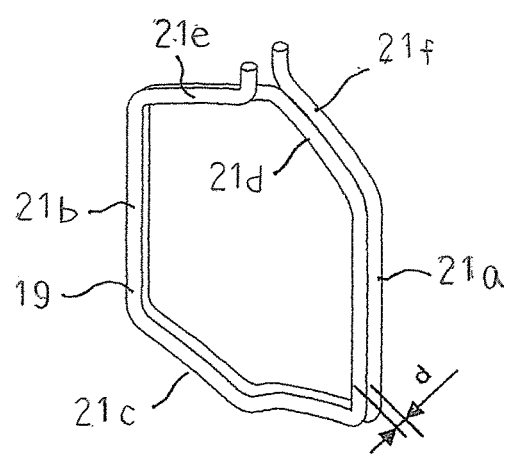
FIG. 5 is an oblique projection that shows a first winding body that constitutes part of an armature winding of the armature that is used in the rotary electric machine according to Embodiment 1 of the present invention.
Figure 6:
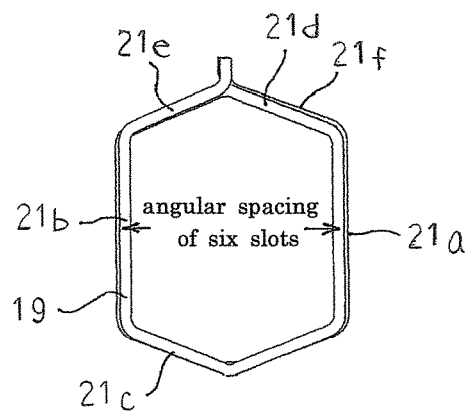
FIG. 6 is a front elevation that shows the first winding body that constitutes part of the armature winding of the armature in the rotary electric machine according to Embodiment 1 of the present invention.
Figure 7:
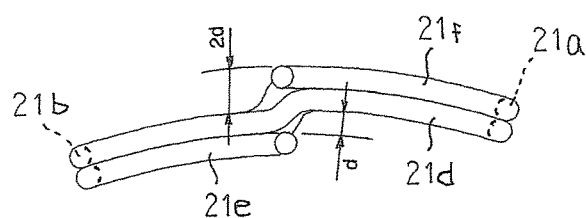
FIG. 7 is an end elevation that shows the first winding body that constitutes part of the armature winding of the armature in the rotary electric machine according to Embodiment 1 of the present invention.
Figure 8:
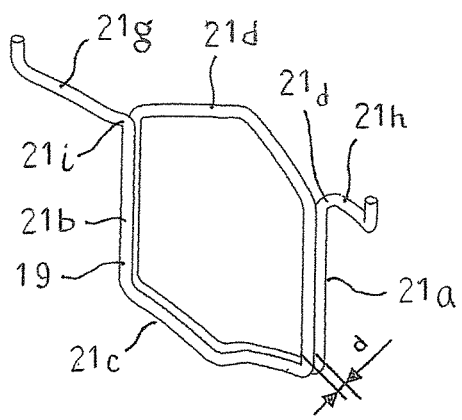
FIG. 8 is an oblique projection that shows a second winding body that constitutes part of an armature winding of the armature that is used in the rotary electric machine according to Embodiment 1 of the present invention.
Figure 9:
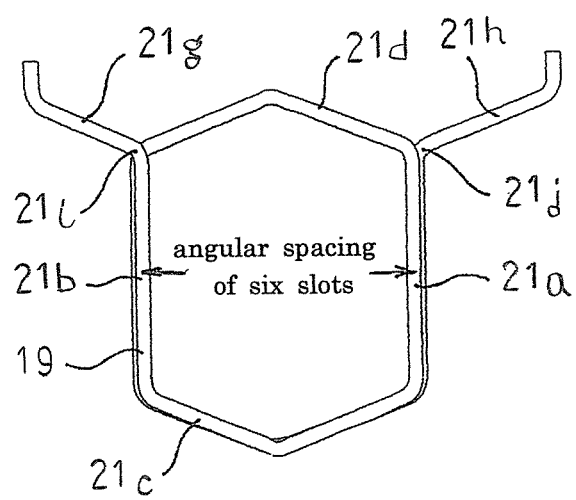
FIG. 9 is a front elevation that shows the second winding body that constitutes part of the armature winding of the armature in the rotary electric machine according to Embodiment 1 of the present invention.
Figure 10:
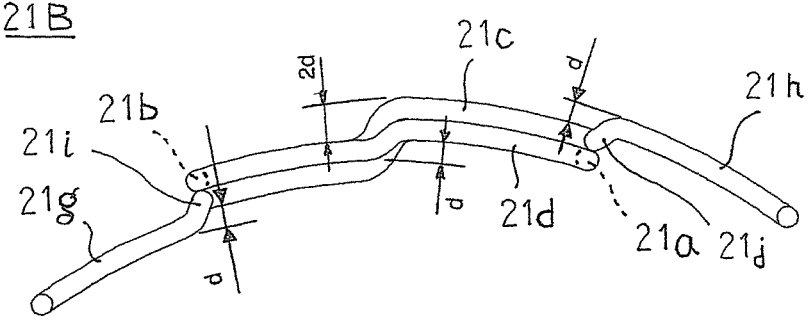
FIG. 10 is an end elevation that shows the second winding body that constitutes part of the armature winding of the armature in the rotary electric machine according to Embodiment 1 of the present invention.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature that is used in the rotary electric machine according to Embodiment 1 of the present invention, FIG. 4 is an oblique projection that shows an armature stator that is used in the rotary electric machine according to Embodiment 1 of the present invention, FIG. 5 is an oblique projection that shows a first winding body that constitutes part of an armature winding of the armature that is used in the rotary electric machine according to Embodiment 1 of the present invention, FIG. 6 is a front elevation that shows the first winding body that constitutes part of the armature winding of the armature in the rotary electric machine according to Embodiment 1 of the present invention, FIG. 7 is an end elevation that shows the first winding body that constitutes part of the armature winding of the armature in the rotary electric machine according to Embodiment 1 of the present invention, FIG. 8 is an oblique projection that shows a second winding body that constitutes part of an armature winding of the armature that is used in the rotary electric machine according to Embodiment 1 of the present invention, FIG. 9 is a front elevation that shows the second winding body that constitutes part of the armature winding of the armature in the rotary electric machine according to Embodiment 1 of the present invention, and FIG. 10 is an end elevation that shows the second winding body that constitutes part of the armature winding of the armature in the rotary electric machine according to Embodiment 1 of the present invention.

In FIGS. 1 and 2, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and permanent magnets 8 that are embedded in a vicinity of an outer circumferential surface of the rotor core 7 so as to be arranged at a uniform pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 10.

As shown in FIG. 3, the armature 10 includes: an armature core 11; an armature winding 20 that is mounted to the armature core 11; and slot cells 13 that are mounted into slots 12 of the armature core 11. The armature winding 20 is configured by connecting a plurality of winding bodies 21 that are mounted into the armature core 11. The slot cells 13 are formed into angular C shapes by bending and shaping oblong sheets that are produced by sandwiching a polyimide film between meta-aramid fibers, for example, and are inserted into the slots 12 to isolate the armature core 11 and the armature winding 20 electrically.

Figure 20:
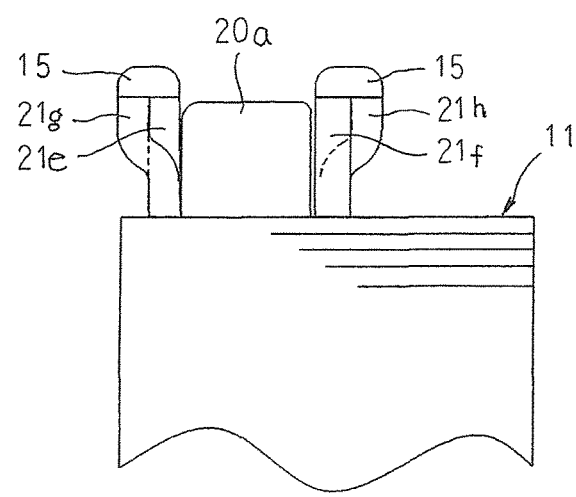
FIG. 20 is a cross section that is taken along Line XX-XX in FIG. 19 so as to be viewed in the direction of the arrows.

Here, to facilitate explanation, the number of poles p in the rotor 5 is ten, the number of slots S in the armature core 11 is sixty, and the armature winding 20 is a three-phase winding. In other words, the slots 12 are formed on the armature core 11 at a ratio of two slots per phase per pole. Furthermore, in FIG. 3, in order to explain connected states of radially inner terminals and radially outer terminals, the radially inner terminals and the radially outer terminals are exaggeratedly depicted so as to protrude axially outward from a coil end group, but in fact the radially inner terminals and the radially outer terminals are formed at an axial height equal to that of the coil end group, as shown in FIG. 20.

As shown in FIG. 4, the armature core 11 is produced by laminating and integrating thin electromagnetic steel sheets, and includes: an annular core back 11a; and a plurality of teeth 11b that are arranged circumferentially so as to each project radially inward from an inner circumferential wall surface of the core back 11a. Spaces that are surrounded by the core back 11a and the teeth 11b constitute the slots 12. The teeth 11b are formed so as to have a tapered shape in which a circumferential width becomes gradually narrower radially inward, and a cross section of the slots 12 that is perpendicular to the central axis of the armature core 11 is oblong.

Winding bodies 21 that constitute part of the armature winding 20 are constituted by first winding bodies 21A and second winding bodies 21B in which directions in which terminals extend are different. The first winding bodies 21A and the second winding bodies 21B are hexagonal coils that are each produced by winding a conductor wire 19 that has a circular cross section that has a diameter d, that is made of jointless, continuous copper wire or aluminum wire that is coated with an insulating enamel resin, for example, for two turns into a shape that is approximately hexagonal and helical. In other words, the first winding bodies 21A and the second winding bodies 21B are winding bodies that are both distributed windings and lap windings. Moreover, the winding bodies 21 may be produced using a conductor wire that has an oblong cross section instead of the conductor wire 19 that has a circular cross section.

As shown in FIGS. 5 through 7, the first winding bodies 21A include: first and second rectilinear portions 21a and 21b that form two columns that are separated by an angular spacing of six slots in which two of each are arranged so as to contact each other in a radial direction in each of the columns; first and second coil ends 21c and 21d that alternately link first longitudinal ends to each other and second longitudinal ends to each other between the columns of first and second rectilinear portions 21a and 21b; a radially inner terminal 21e that constitutes a first conductor terminal; and a radially outer terminal 21f that constitutes a second conductor terminal. Moreover, an angular spacing of six slots is a spacing between slot centers of slots 12 on two sides of six consecutive teeth 11b, and corresponds to a pitch of one magnetic pole. The "radial direction" corresponds to the radial direction of the armature core 11.

The first coil ends 21c extend longitudinally outward relative to the first and second rectilinear portions 21a and 21b from first ends of first rectilinear portions 21a in a first column toward second rectilinear portions 21b in a second column, are displaced radially inward by 2d by being bent at central portions between the columns of first and second rectilinear portions 21a and 21b, and are subsequently bent and extend longitudinally inward relative to the first and second rectilinear portions 21a and 21b toward the second rectilinear portions 21b in the second column, and are connected to first ends of the second rectilinear portions 21b in the second column.

Similarly, the second coil end 21d extends longitudinally outward relative to the first and second rectilinear portions 21a and 21b from a second end of the second rectilinear portion 21b in the second column toward a first rectilinear portion 21a in the first column, is displaced radially outward by d by being bent at a central portion between the columns of first and second rectilinear portions 21a and 21b, and is subsequently bent and extends longitudinally inward relative to the first and second rectilinear portions 21a and 21b toward the first rectilinear portion 21a in the first column, and is connected to a second end of the first rectilinear portion 21a in the first column.

The radially inner terminal 21e extends parallel to the second coil end 21d from a second end of the second rectilinear portion 21b that is radially inside toward a first rectilinear portion 21a in the first column, is bent at a central portion between the columns of first and second rectilinear portions 21a and 21b, and extends outward in a longitudinal direction of the first and second rectilinear portions 21a and 21b. The radially outer terminal 21f extends parallel to the second coil end 21d from a second end of the first rectilinear portion 21a that is radially outside toward a second rectilinear portion 21b in the second column, is bent at a central portion between the columns of first and second rectilinear portions 21a and 21b, and extends outward in a longitudinal direction of the first and second rectilinear portions 21a and 21b.

In a first winding body 21A that is configured in this manner, the first rectilinear portions 21a are housed inside a first slot 12 in first and second positions from radially outside, and the second rectilinear portions 21b are housed inside a slot 12 that is separated by an angular spacing of six slots from the first slot 12 in third and fourth positions from radially outside. The radially outer terminal 21f extends to a vicinity of a top portion of the second coil end 21d so as to be at a radial position that is aligned with the first rectilinear portion 21a that is housed inside the first slot 12 in the first position from radially outside. The radially inner terminal 21e extends to a vicinity of a top portion of the second coil end 21d so as to be at a radial position that is aligned with the second rectilinear portion 21b that is housed inside the slot 12 that is separated by an angular spacing of six slots from the first slot 12 in the fourth position from radially outside.

As shown in FIGS. 8 through 10, the second winding bodies 21B include: first and second rectilinear portions 21a and 21b that form two columns that are separated by an angular spacing of six slots in which two of each are arranged so as to contact each other in a radial direction in each of the columns; first and second coil ends 21c and 21d that alternately link first longitudinal ends to each other and second longitudinal ends to each other between the columns of first and second rectilinear portions 21a and 21b; a radially inner terminal 21g that constitutes a first conductor terminal; and a radially outer terminal 21h that constitutes a second conductor terminal.

The first coil ends 21c extend longitudinally outward relative to the first and second rectilinear portions 21a and 21b from first ends of first rectilinear portions 21a in a first column toward second rectilinear portions 21b in a second column, are displaced radially inward by 2d by being bent at central portions between the columns of first and second rectilinear portions 21a and 21b, and are subsequently bent and extend longitudinally inward relative to the first and second rectilinear portions 21a and 21b toward the second rectilinear portions 21b in the second column, and are connected to first ends of the second rectilinear portions 21b in the second column.

Similarly, the second coil end 21d extends longitudinally outward relative to the first and second rectilinear portions 21a and 21b from a second end of the second rectilinear portion 21b in the second column toward a first rectilinear portion 21a in the first column, is displaced radially outward by d by being bent at a central portion between the columns of first and second rectilinear portions 21a and 21b, and is subsequently bent and extends longitudinally inward relative to the first and second rectilinear portions 21a and 21b toward the first rectilinear portion 21a in the first column, and is connected to a second end of the first rectilinear portion 21a in the first column.

The radially inner terminal 21g is bent at a displacing portion 21i that extends out from a second end of the second rectilinear portions 21b that is radially inside and is displaced radially inward by d, and then extends parallel to, and by a length equal to, a portion of the second coil end 21d from a second end of the first rectilinear portion 21a to a central portion between the columns of first and second rectilinear portions 21a and 21b, and is subsequently bent and extends outward in a longitudinal direction of the first and second rectilinear portions 21a and 21b. The radially outer terminal 21h is bent at a displacing portion 21j that extends out from a second end of the first rectilinear portions 21a that is radially outside and is displaced radially outward by d, and then extends parallel to, and by a length equal to, a portion of the second coil end 21d from a second end of the second rectilinear portion 21b to a central portion between the columns of first and second rectilinear portions 21a and 21b, and is subsequently bent and extends outward in a longitudinal direction of the first and second rectilinear portions 21a and 21b.

In a second winding body 21B that is configured in this manner, the first rectilinear portions 21a are housed inside a first slot 12 in first and second positions from radially outside, and the second rectilinear portions 21b are housed inside a slot 12 that is separated by an angular spacing of six slots from the first slot 12 in third and fourth positions from radially outside. The radially outer terminal 21h is displaced by the displacing portion 21j radially outward by d relative to the first rectilinear portion 21a that is housed inside the first slot 12 in the first position from radially outside, and then extends outward in a circumferential direction of the second winding body 21B. The radially inner terminal 21g is displaced by the displacing portion 21i radially inward by d relative to the second rectilinear portion 21b that is housed inside the slot 12 that is separated by an angular spacing of six slots from the first slot 12 in the fourth position from radially outside, and then extends outward in a circumferential direction of the second winding body 21B.

Figure 11:
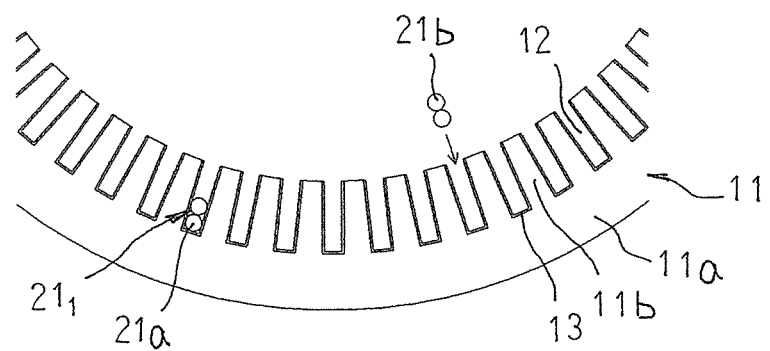
FIG. 11 is a partial end elevation that explains a method for mounting a first of the winding bodies into the armature core in the rotary electric machine according to Embodiment 1 of the present invention.
Figure 12:
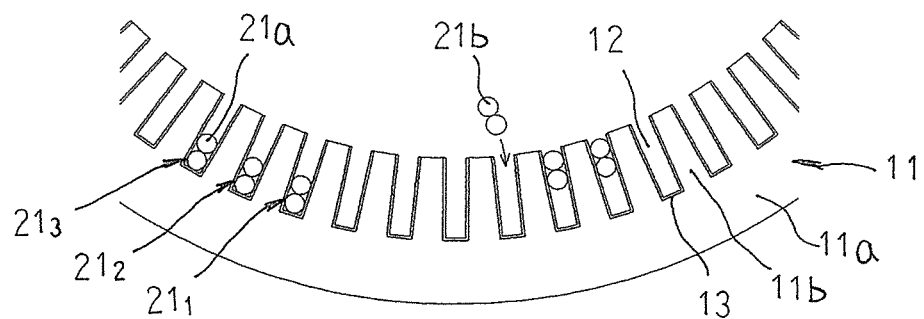
FIG. 12 is a partial end elevation that explains a method for mounting a third of the winding bodies into the armature core in the rotary electric machine according to Embodiment 1 of the present invention.
Figure 13:
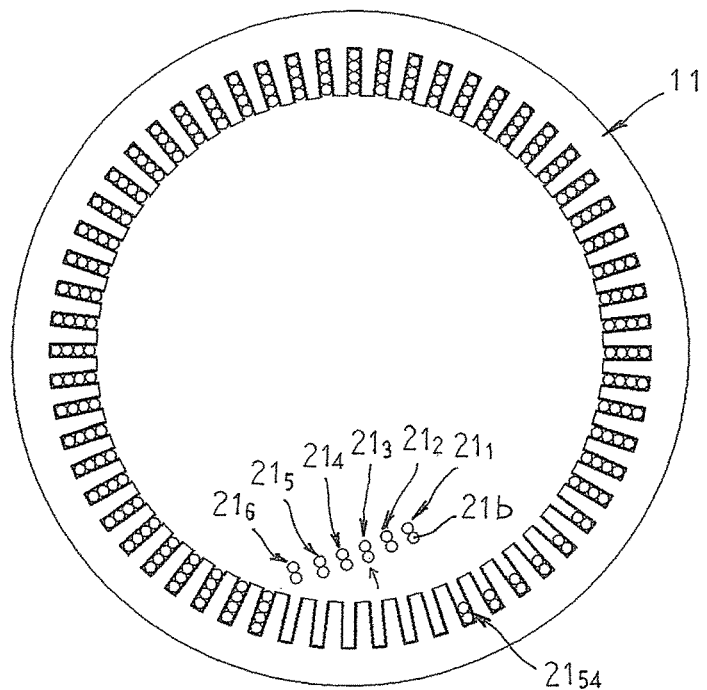
FIG. 13 is an end elevation that explains a method for mounting a last six of the winding bodies into the armature core in the rotary electric machine according to Embodiment 1 of the present invention.
Figure 14:
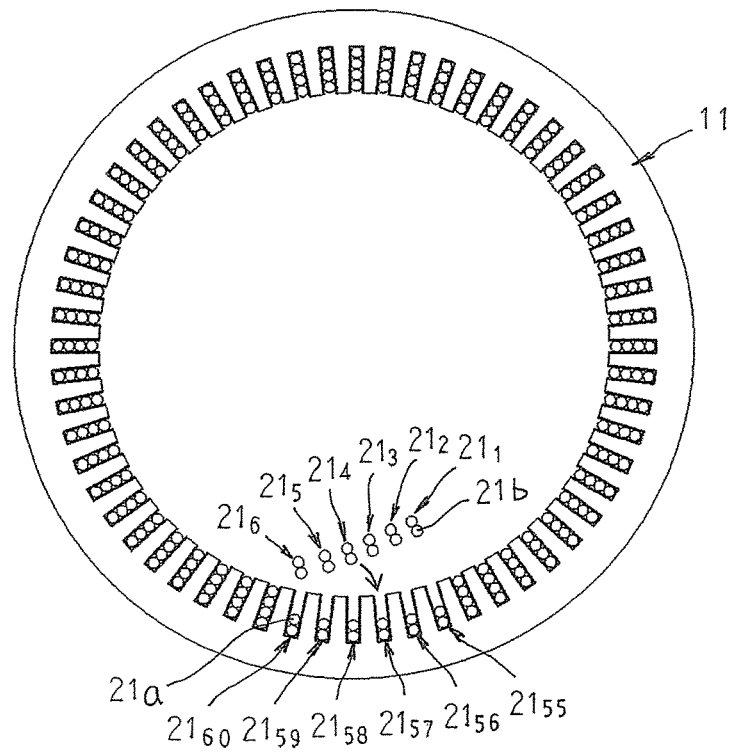
FIG. 14 is an end elevation that explains the method for mounting the last six of the winding bodies into the armature core in the rotary electric machine according to Embodiment 1 of the present invention.
Figure 15:
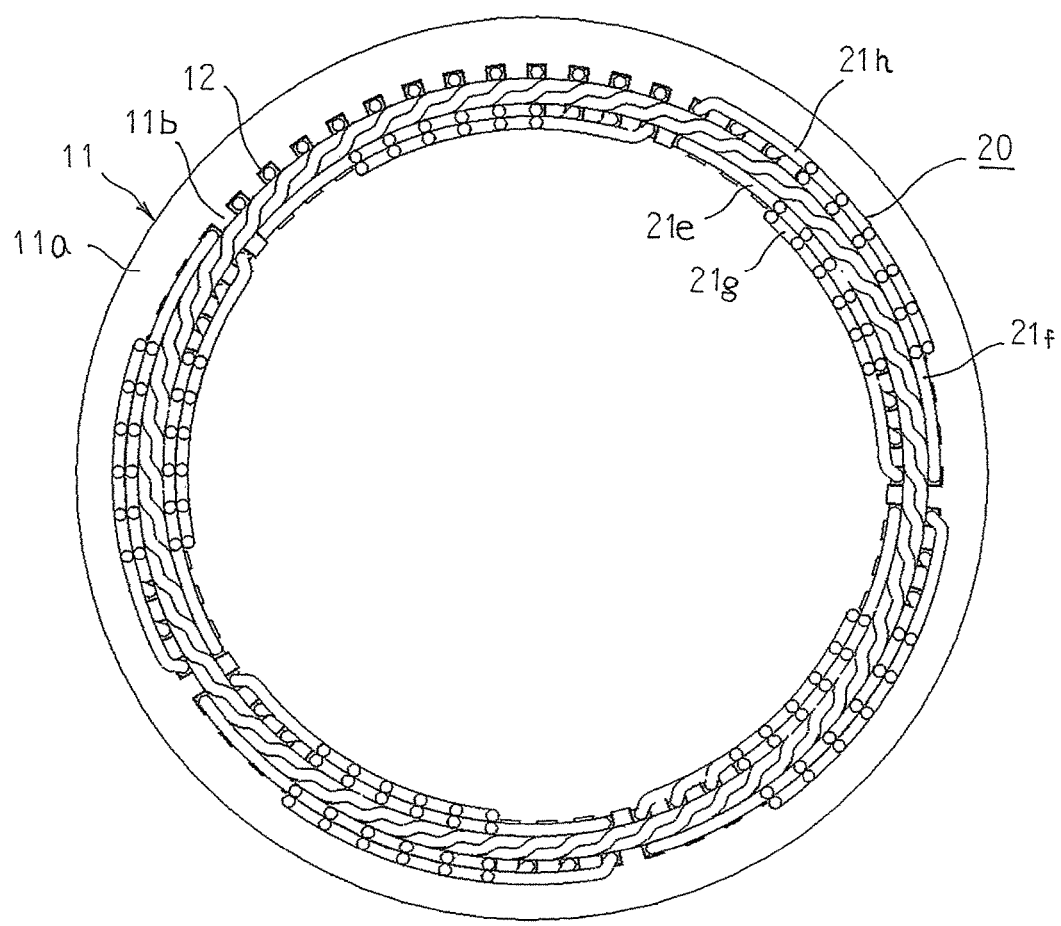
FIG. 15 is an end elevation that shows the armature core to which the winding bodies have been mounted in the rotary electric machine according to Embodiment 1 of the present invention.

Next, a method for mounting the first winding bodies 21A and the second winding bodies 21B onto the armature core 11 will be explained with reference to FIGS. 11 through 15. FIG. 11 is a partial end elevation that explains a method for mounting a first of the winding bodies into the armature core in the rotary electric machine according to Embodiment 1 of the present invention, FIG. 12 is a partial end elevation that explains a method for mounting a third of the winding bodies into the armature core in the rotary electric machine according to Embodiment 1 of the present invention, FIG. 13 is an end elevation that explains a method for mounting a last six of the winding bodies into the armature core in the rotary electric machine according to Embodiment 1 of the present invention, FIG. 14 is an end elevation that explains the method for mounting the last six of the winding bodies into the armature core in the rotary electric machine according to Embodiment 1 of the present invention, and FIG. 15 is an end elevation that shows the armature core to which the winding bodies have been mounted in the rotary electric machine according to Embodiment 1 of the present invention. Moreover, for simplicity, the winding bodies are represented only by the first and second rectilinear portions in FIGS. 11 through 14.

First, winding bodies 21 are produced by winding conductor wires 19 for two turns into a helical shape. Here, to facilitate explanation, the winding bodies 21 are designated "winding body $21_1$", "winding body $21_2$", "winding body $21_3$", etc., through "winding body $21_{59}$", and "winding body $21_{60}$" in order of mounting.

As shown in FIG. 11, a first of the winding bodies $21_1$ is mounted from radially inside the armature core 11 into a pair of slots 12 that are separated by an angular spacing of six slots. Similarly, a second of the winding bodies $21_2$ is mounted from radially inside into a pair of slots 12 that are offset by a pitch of one slot in a first circumferential direction. Next, as shown in FIG. 12, a third of the winding bodies $21_3$ is mounted from radially inside into a pair of slots 12 that are offset by a pitch of one slot in a first circumferential direction. This procedure is repeated until a fifty-fourth of the winding bodies $21_{54}$ is mounted into the armature core 11.

Next, as shown in FIG. 13, the second rectilinear portions 21b of the first of the winding bodies $21_1$ through the sixth of the winding bodies $21_6$, which are housed in the third position and the fourth position from radially outside inside each of the slots 12, are pulled radially inward out of the slots 12. Next, a fifty-fifth of the winding bodies $21_{55}$, a fifty-sixth of the winding bodies $21_{56}$, a fifty-seventh of the winding bodies $21_{57}$, etc., through a sixtieth of the winding bodies $21_{60}$ are similarly mounted to the armature core 11 one at a time in that order. Then, as shown in FIG. 14, the second rectilinear portions 21b of the first of the winding bodies $21_1$ through the sixth of the winding bodies $21_6$ are inserted into the third position and the fourth position from radially outside inside each of the slots 12, completing mounting of the sixty winding bodies 21 to the armature core 11.

Here, the first winding bodies 21A are used in the first through sixth, the thirteenth through eighteenth, the twenty-fifth through thirtieth, the thirty-seventh through forty-second, and the forty-ninth through fifty-fourth of the winding bodies 21, and the second winding bodies 21B are used in the seventh through twelfth, the nineteenth through twenty-fourth, the thirty-first through thirty-sixth, the forty-third through forty-eighth, and the fifty-fifth through sixtieth of the winding bodies 21.

The first winding bodies 21A and the second winding bodies 21B are thereby mounted to the armature core 11 so as to alternate six at a time. The radially inner terminals 21e of the first winding bodies 21A are kept aligned with the fourth radial position from radially outside inside the slots 12, and the radially outer terminals 21f are kept aligned with the first radial position from radially outside inside the slots 12. In addition, the radially inner terminals 21g of the second winding bodies 21B are displaced by a width d of the conductor wire 19 radially inward from the fourth radial position from radially outside inside the slots 12, and the radially outer terminals 21h are displaced by the width d of the conductor wire 19 radially outward from the first radial position from radially outside inside the slots 12.

Thus, the radially inner terminals 21e and 21g protrude on a radially inner side of a coil end group 20a, and the radially outer terminals 21f and 21h protrude on a radially outer side of the coil end group 20a. As shown in FIG. 15, five sets of terminal pairs in which six pairs of radially inner terminals 21e and 21g of the winding bodies 21 that are separated by 180 electrical degrees are arranged at a pitch of one slot in a circumferential direction so as to be stacked in a radial direction are formed so as to be separated in a circumferential direction. Four sets of terminal pairs in which six pairs of radially outer terminals 21f and 21h of the winding bodies 21 that are separated by 180 electrical degrees are arranged at a pitch of one slot in a circumferential direction so as to be stacked in a radial direction are formed so as to be separated in a circumferential direction. Twelve radially outer terminals 21f and 21h are arranged between sets of terminal pairs at a pitch of one slot.

Figure 16:
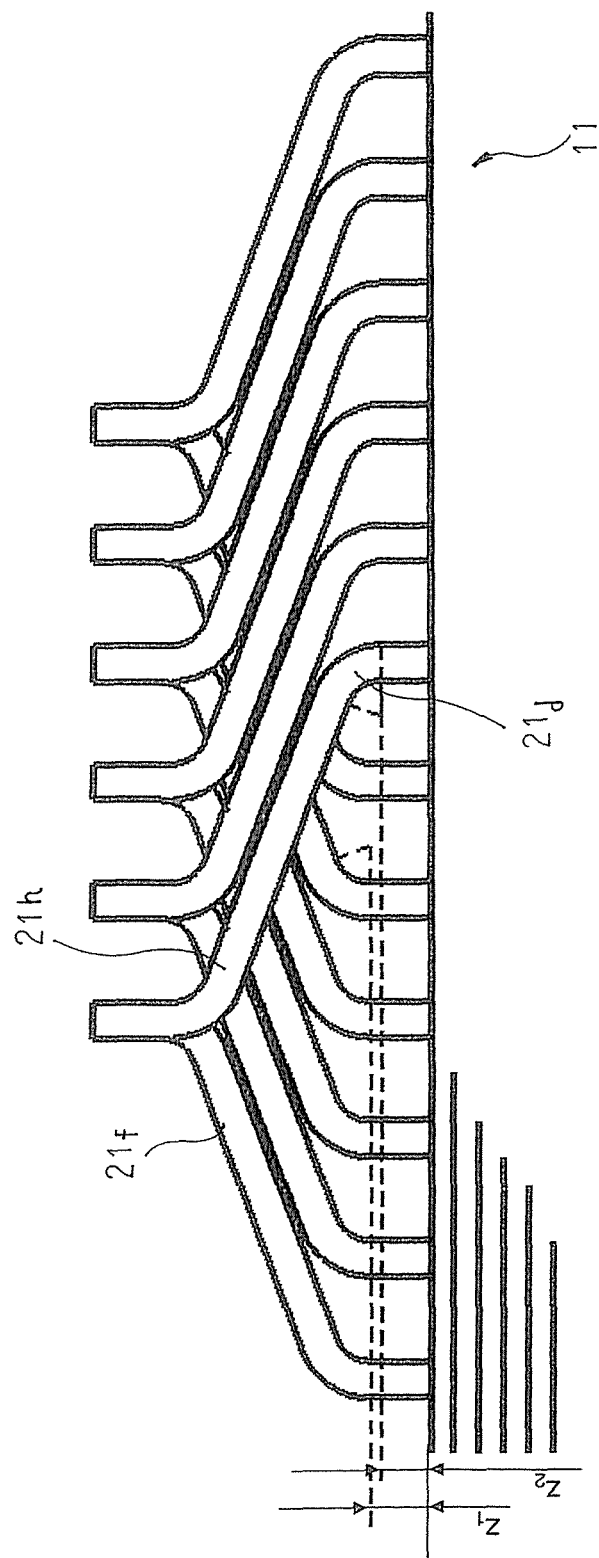
FIG. 16 is a partial side elevation that shows a state in which the armature in the rotary electric machine according to Embodiment 1 of the present invention is viewed from radially outside.

Now, a state in which the sixty winding bodies 21 are mounted to the armature core 11 when viewed from radially outside is shown in FIG. 16. As shown in FIG. 16, the radially outer terminals 21f of the first winding bodies 21A and the radially outer terminals 21h of the second winding bodies 21B cross each other when viewed from radially outside. Although not shown, the radially inner terminals 21e of the first winding bodies 21A and the radially inner terminals 21g of the second winding bodies 21B also cross each other when viewed from radially inside.

In addition, as shown in FIG. 16, a distance $Z_1$ in the radially outer terminals 21f from an end surface of the armature core 11 to a bending starting position (a circumferential bending position) is longer than a distance $Z_2$ in the radially outer terminals 21h from the end surface of the armature core 11 to a bending starting position (a circumferential bending position) of the displacing portion 21j. Although not shown, a distance $Z_1$ in the radially inner terminals 21e from an end surface of the armature core 11 to a bending starting position (a circumferential bending position) is longer than a distance $Z_2$ in the radially inner terminals 21g from the end surface of the armature core 11 to a bending starting position (a circumferential bending position) of the displacing portion 21i. Spaces where the displacing portions 21i and 21j are formed can thereby be widened, facilitating production of the radially inner terminals 21g and the radially outer terminals 21h at which radial positions displace by a radial width d of the conductor wire 19.

Figure 17:
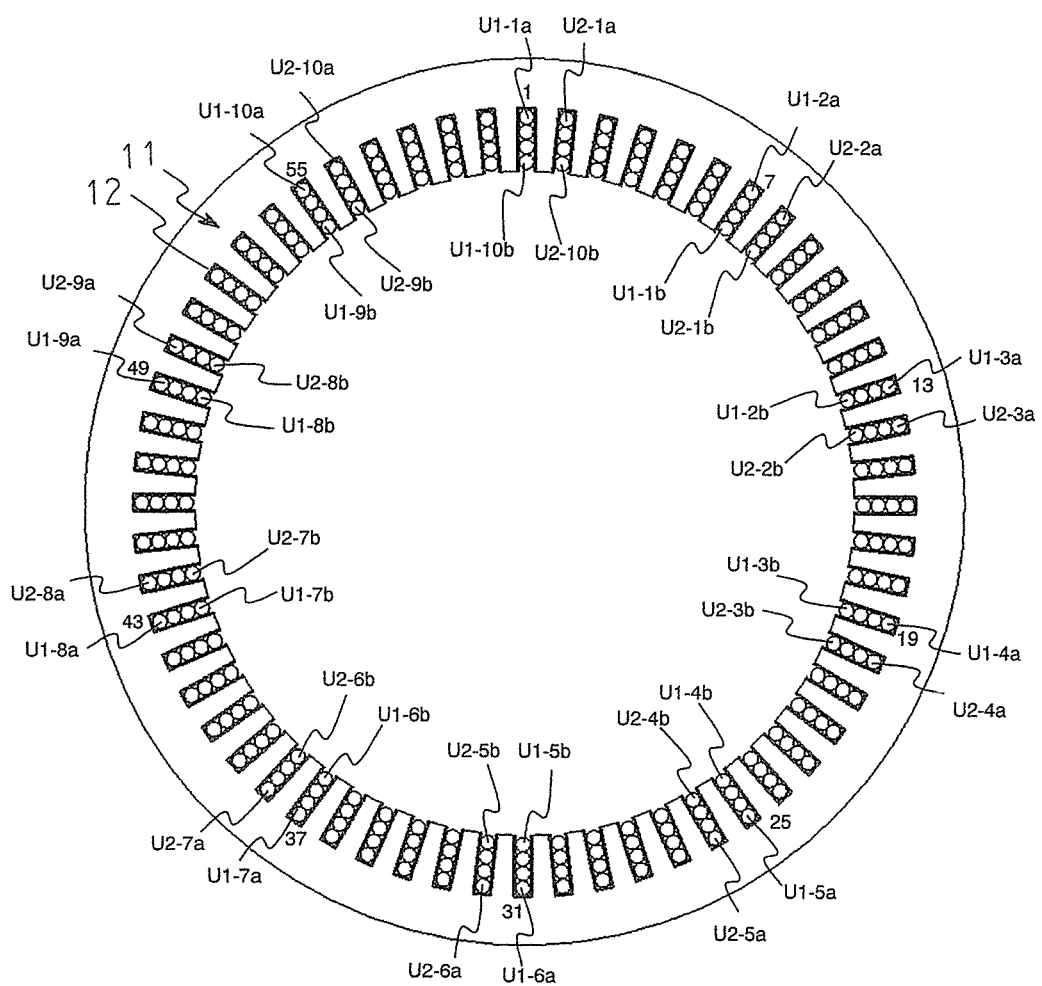
FIG. 17 is an end elevation of the armature in the rotary electric machine according to Embodiment 1 of the present invention when viewed from an axial direction.

Next, a method for connecting the armature winding 20 will be explained with reference to FIGS. 17, 18A and 18B. Moreover, FIG. 17 is an end elevation of the armature in the rotary electric machine according to Embodiment 1 of the present invention when viewed from an axial direction, and FIGS. 18A and 18B show connection diagrams for the armature winding in the rotary electric machine according to Embodiment 1 of the present invention. Moreover, for simplicity, the winding bodies 21 are represented only by the first and second rectilinear portions in FIG. 17.

In FIG. 17, 1, 7, 13, etc., through 49, and 55 are slot numbers that have been allotted to the slots 12 sequentially in a circumferential direction. U1-1a, U1-2a, etc., through U1-10a and U1-1b, U1-2b, etc., through U1-10B are first rectilinear portions that connect to radially outer terminals 21f and 21h of winding bodies 21 that constitute a U1-phase winding that is mounted into a group of slots 12 at Slot Numbers (1+6n), where n is a natural number that includes 0, and U2-1a, U2-2a, etc., through U2-10a and U2-1b, U2-2b, etc., through U2-10b are second rectilinear portions 21b that connect to radially inner terminals 21e and 21g of winding bodies 21 that constitute a U2-phase winding that is mounted into a group of slots 12 at Slot Numbers (2+Gn).

Winding bodies 21 are also mounted into a slot group at Slot Numbers (3+Gn) to constitute a V1-phase winding, and winding bodies 21 are mounted into a slot group at Slot Numbers (4+6n) to constitute a V2-phase winding. Winding bodies 21 are also mounted into a slot group at Slot Numbers (5+Gn) to constitute a W1-phase winding, and winding bodies 21 are mounted into a slot group at Slot Numbers (6+Gn) to constitute a W2-phase winding. Moreover, because a U-phase winding, a V-phase winding, and a W-phase winding are connected in a similar manner, only the connection method for the U-phase winding will be explained here.

First, as shown in FIG. 18A, U1-1b and U1-2b, U1-2a and U1-3a, U1-3b and U1-4b, U1-4a and U1-5a, U1-5b and U1-6b, U1-6a and U1-7a, U1-7b and U1-8b, U1-8a and U1-9a, and U1-9b and U1-10b, which are each separated by a pitch of one pole in the circumferential direction, are connected by welding, etc., to form the U1-phase winding. Moreover, "connecting" U1-1b and U1-2b means connecting the radially outer terminals 21f and 21h that extend outward from the first rectilinear portions 21a of U1-1b and U1-2b.

Next, as shown in FIG. 18B, U2-1b and U2-2b, U2-2a and U2-3a, U2-3b and U2-4b, U2-4a and U2-5a, U2-5b and U2-6b, U2-6a and U2-7a, U2-7b and U2-8b, U2-8a and U2-9a, and U2-9b and U2-10b, which are each separated by a pitch of one pole in the circumferential direction, are connected by welding, etc., to form the U2-phase winding. Next, U1-10a and U2-1a are connected by welding, etc., to connect the U1-phase winding and the U2-phase winding in series. The U-phase winding is thereby formed so as to have U1-1a as a power supplying terminal and U2-10a as a neutral point.

The V-phase winding and the W-phase winding are formed in a similar manner. Then, the neutral points are connected to obtain an armature winding 20 that is formed into a three-phase alternating-current winding in which the U-phase winding, the V-phase winding, and the W-phase winding are wye-connected.

Figure 19:
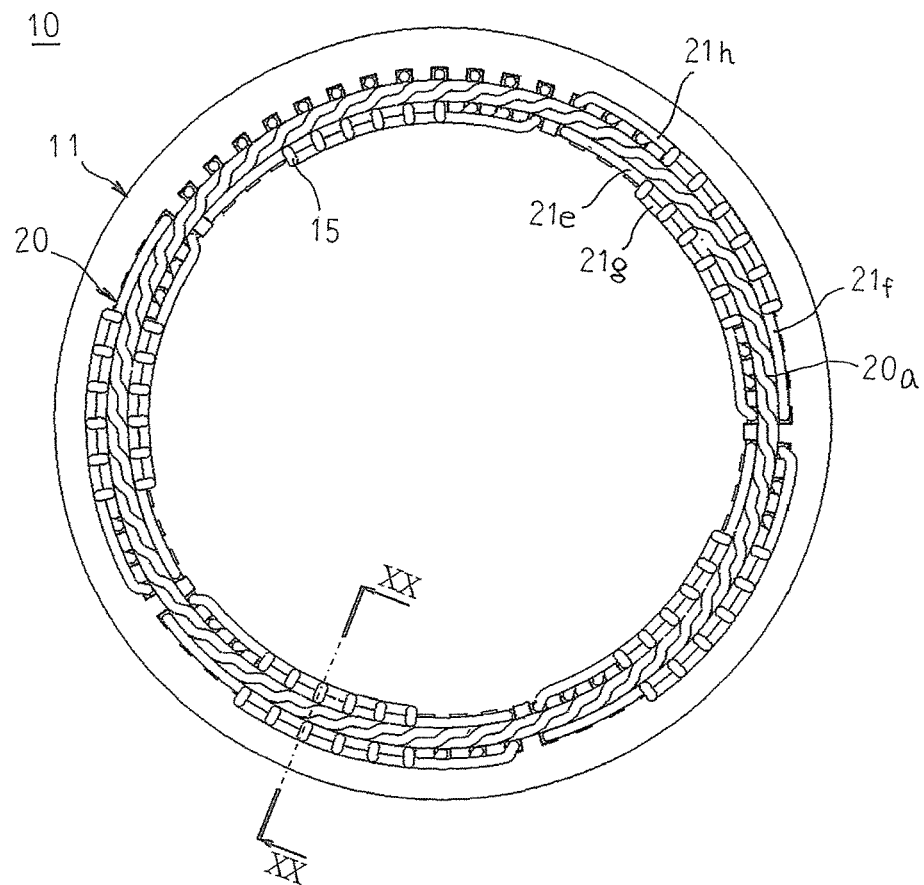
FIG. 19 is an end elevation that shows the armature in the rotary electric machine according to Embodiment 1 of the present invention.

A connected state of the armature winding 20 of the armature 10 that has been produced in this manner will now be explained with reference to FIGS. 19 and 20. FIG. 19 is an end elevation that shows the armature in the rotary electric machine according to Embodiment 1 of the present invention, and FIG. 20 is a cross section that is taken along Line XX-XX in FIG. 19 so as to be viewed in the direction of the arrows.

In the armature 10, as shown in FIGS. 19 and 20, five terminal pair groups in which six pairs of radially inner terminals 21e and 21g that are stacked in a radial direction are arranged at a pitch of one slot circumferentially around a radially inner side of the coil end group 20a are formed so as to be separated in a circumferential direction. Four terminal pair groups in which six pairs of radially outer terminals 21f and 21h that are stacked in a radial direction are arranged at a pitch of one slot circumferentially around a radially outer side of the coil end group 20a are formed so as to be separated in a circumferential direction. Beads 15 that are obtained by joining the pairs of radially inner terminals 21e and 21g to each other and by joining the pairs of radially outer terminals 21f and 21h to each other by welding, etc., are covered and insulated using insulative tape, caps, or powder.

A rotary electric machine 100 that uses the armature 10 that is connected in this manner operates as a ten-pole sixty-slot inner-rotor three-phase motor when alternating-current power is supplied to the armature winding 20.

Thus, according to Embodiment 1, sixty (equal in number to the total number of slots) winding bodies 21 that are both distributed windings and lap windings are mounted to an armature core 11 at a pitch of one slot. The winding bodies 21 are configured such that radially inner terminals 21e and 21g that are first ends of conductor wires 19 extend outward at a first axial end of the armature core 11 from radially innermost positions inside slots 12, and radially outer terminals 21f and 21h that are second ends of the conductor wires 19 extend outward at the first axial end of the armature core 11 from radially outermost positions inside the slots 12. In addition, respective phase windings of the armature winding 20 are configured by directly joining together the radially inner terminals 21e and 21g and by directly joining together the radially outer terminals 21f and 21h of the winding bodies 21 that constitute identical phases.

Thus, it is not necessary to pass the radially inner terminals 21e and 21g and the radially outer terminals 21f and 21h axially outside a coil end group 20a, enabling axial dimensions of the armature 10 to be reduced.

Separate parts such as busbars for connecting the terminals of the winding bodies 21 to each other are also no longer required, enabling the number of parts in the armature 10 to be reduced.

The radially inner terminals 21e of first winding bodies 21A are kept aligned with a fourth radial position from radially outside inside the slots 12, and the radially outer terminals 21f are kept aligned with a first radial position from radially outside inside the slots 12. The radially inner terminals 21g of the second winding bodies 21B are displaced by a width d of the conductor wire 19 radially inward from the fourth radial position from radially outside inside the slots 12, and the radially outer terminals 21h are displaced by the width d of the conductor wire 19 radially outward from the first radial position from radially outside inside the slots 12. Thus, the radially inner terminals 21g can be led around in a circumferential direction and joined to the corresponding radially inner terminals 21e without being interfered with by the radially inner terminals 21e. The radially outer terminals 21h can also be led around in a circumferential direction and joined to the corresponding radially outer terminals 21f without being interfered with by the radially outer terminals 21f. Consequently, radial bulging of the coil end group 20a can be reduced.

Embodiment 2

Figure 21A:
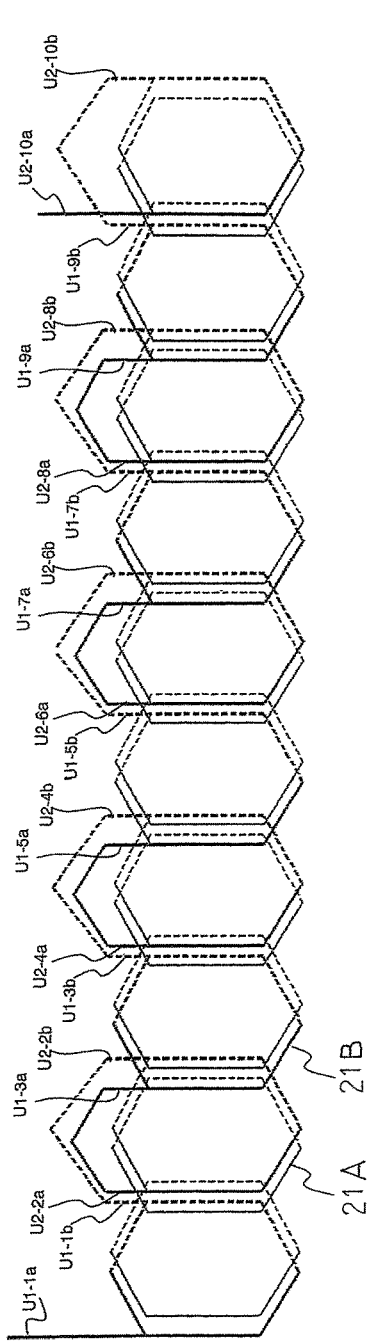
FIGS. 21A and 21B show connection diagrams for an armature winding in a rotary electric machine according to Embodiment 2 of the present invention.
Figure 21B:
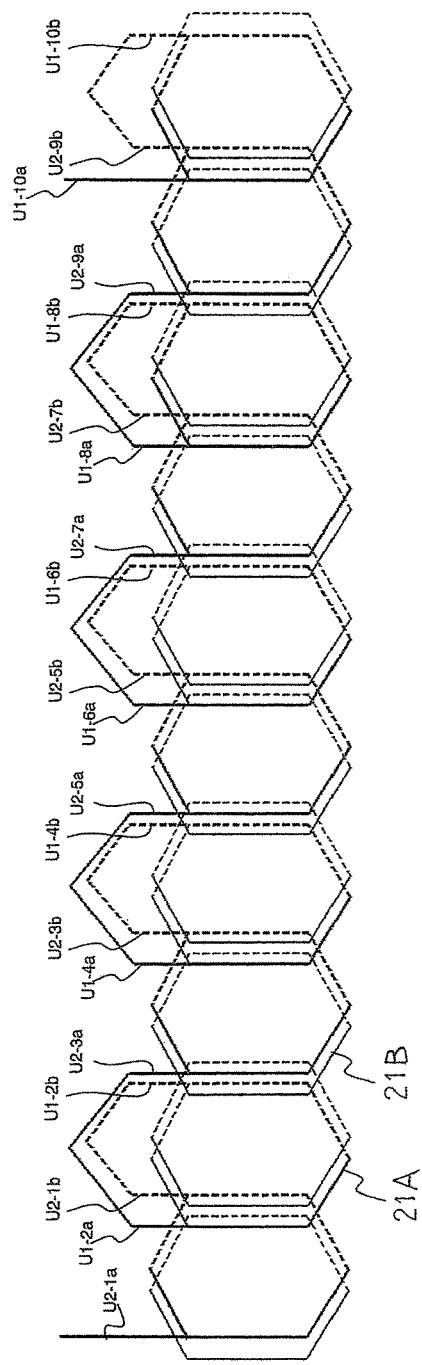

FIGS. 21A and 21B show connection diagrams for an armature winding in a rotary electric machine according to Embodiment 2 of the present invention.

Embodiment 2 is configured in a similar manner to Embodiment 1 above except for the fact that a connection method for an armature winding is different.

First, as shown in FIG. 21A, U1-1b and U2-2b, U2-2a and U1-3a, U1-3b and U2-4b, U2-4a and U1-5a, U1-5b and U2-6b, U2-6a and U1-7a, U1-7b and U2-8b, U2-8a and U1-9a, and U1-9b and U2-10b are connected by welding, etc., to form a U1-phase winding.

As shown in FIG. 21B, U2-1b and U1-2b, U1-2a and U2-3a, U2-3b and U1-4b, U1-4a and U2-5a, U2-5b and U1-6b, U1-6a and U2-7a, U2-7b and U1-8b, U1-8a and U2-9a, and U2-9b and U1-10b are connected by welding, etc., to form a U2-phase winding. Next, U2-10a and U2-1a are connected by welding, etc., to connect the U1-phase winding and the U2-phase winding in series. The U-phase winding is thereby formed so as to have U1-1a as a power supplying terminal and U1-10a as a neutral point.

The V-phase winding and the W-phase winding are formed in a similar manner. Then, the neutral points are connected to obtain an armature winding that is formed into a three-phase alternating-current winding in which the U-phase winding, the V-phase winding, and the W-phase winding are wye-connected.

In Embodiment 2, the winding bodies 21 are also mounted to the armature core at a pitch of one slot, and the radially inner terminals 21e and 21g of the winding bodies 21 protrude on a radially inner side of a coil end group 20a, and the radially outer terminals 21f and 21h protrude on a radially outer side of the coil end group 20a. Respective phase windings are configured by directly joining together the radially inner terminals 21e and 21g and by directly joining together the radially outer terminals 21f and 21h of the winding bodies 21 that constitute identical phases. Consequently, similar or identical effects to those in Embodiment 1 above are also exhibited in Embodiment 2.

Embodiment 3

Figure 22:
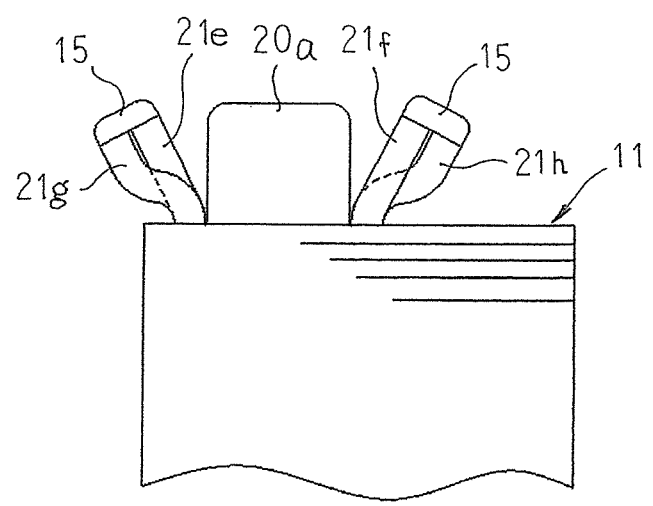
FIG. 22 is a partial cross section that shows a vicinity of a coil end of an armature in a rotary electric machine according to Embodiment 3 of the present invention.

FIG. 22 is a partial cross section that shows a vicinity of a coil end of an armature in a rotary electric machine according to Embodiment 3 of the present invention.

In FIG. 22, pairs of radially inner terminals 21e and 21g that are stacked in a radial direction are inclined radially inward such that beads 15 are separated radially inward from a coil end group 20a. Pairs of radially outer terminals 21f and 21h that are stacked in a radial direction are inclined radially outward such that the beads 15 are separated radially outward from the coil end group 20a.

Moreover, the rest of the configuration is formed in a similar or identical manner to that of Embodiment 1 above.

According to Embodiment 3, pairs of radially inner terminals 21e and 21g are inclined radially inward such that beads 15 that are joint portions between the pairs of radially inner terminals 21e and 21g are separated radially inward from a coil end group 20a. Pairs of radially outer terminals 21f and 21h are inclined radially outward such that beads 15 that are joint portions between the pairs of radially outer terminals 21f and 21h are separated radially outward from the coil end group 20a. Thus, axial height of the terminals of the winding bodies 21 can be lowered. In addition, the occurrence of damage to the insulating coatings on the conductor wires that constitute the coil end due to torch flame and sputtering during joining between the pairs of radially outer terminals 21f and 21h can be suppressed.

Embodiment 4

Figure 23A:
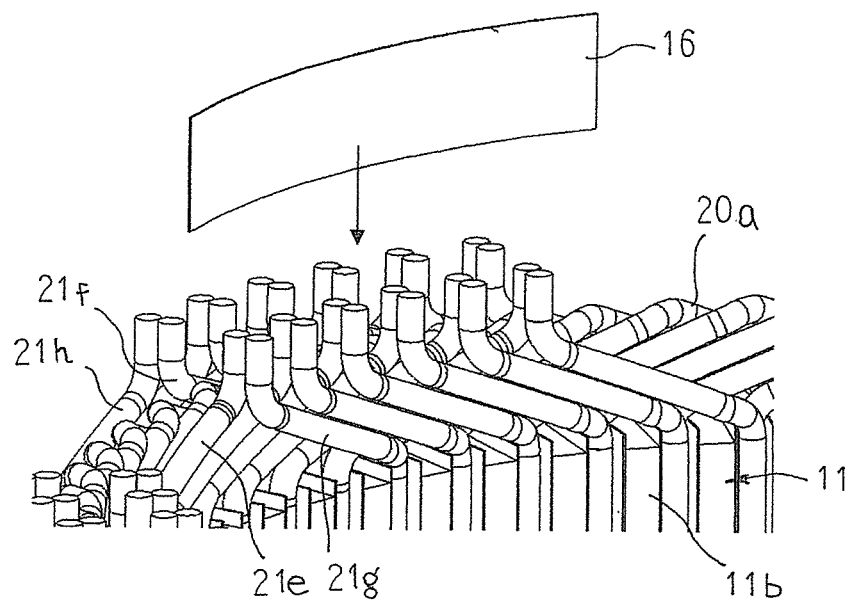
FIGS. 23A and 23B show diagrams that explain an interphase insulating method for an armature winding in a rotary electric machine according to Embodiment 4 of the present invention.
Figure 23B:
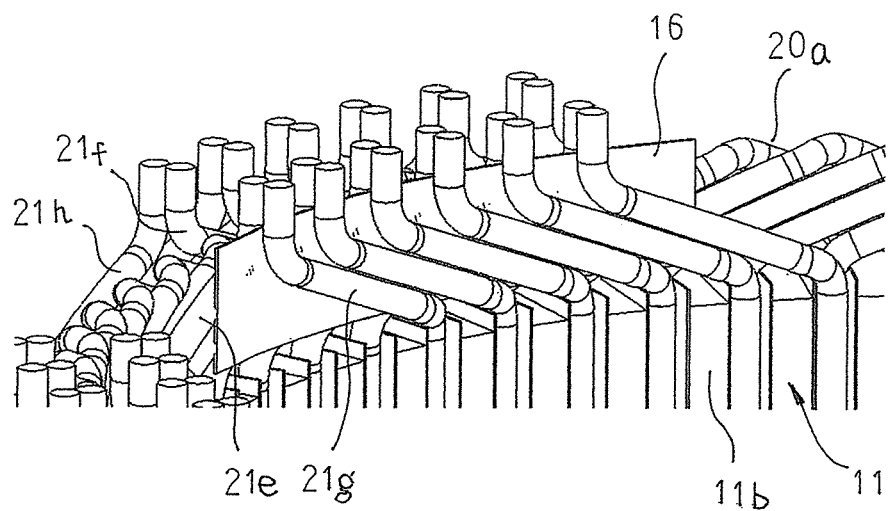

FIGS. 23A and 23B show diagrams that explain an interphase insulating method for an armature winding in a rotary electric machine according to Embodiment 4 of the present invention.

In Embodiment 4, as shown in FIG. 23A, before a step of joining pairs of radially inner terminals 21e and 21g that are stacked in a radial direction, an insulating sheet 16 that is produced using a polyimide, an aramid, polyethylene terephthalate (PET), or polyphenylene sulfide (PPS), etc., is inserted from axially outside between the radially inner terminals 21e and 21g that form the pairs. As shown in FIG. 23B, the insulating sheet 16 is thereby disposed between the radially inner terminals 21e and 21g, which cross each other when viewed from radially inside. Similarly, an insulating sheet 16 is also disposed between the radially outer terminals 21f and 21h that cross each other when viewed from radially outside.

Moreover, the rest of the configuration is formed in a similar or identical manner to that of Embodiment 1 above.

According to Embodiment 4, because the insulating sheets 16 are disposed between different-phase radially inner terminals 21e and 21g between different-phase radially outer terminals 21f and 21h that cross each other when viewed from a radial direction, interphase insulation is ensured, enabling an armature that has increased insulation to be achieved.

Moreover, in Embodiments 1 through 3 above, winding bodies are configured by winding conductor wires for two turns into a helical shape, but the number of turns of the conductor wire is not limited to two turns provided that it is greater than or equal to two turns.

Embodiment 5

Figure 24:
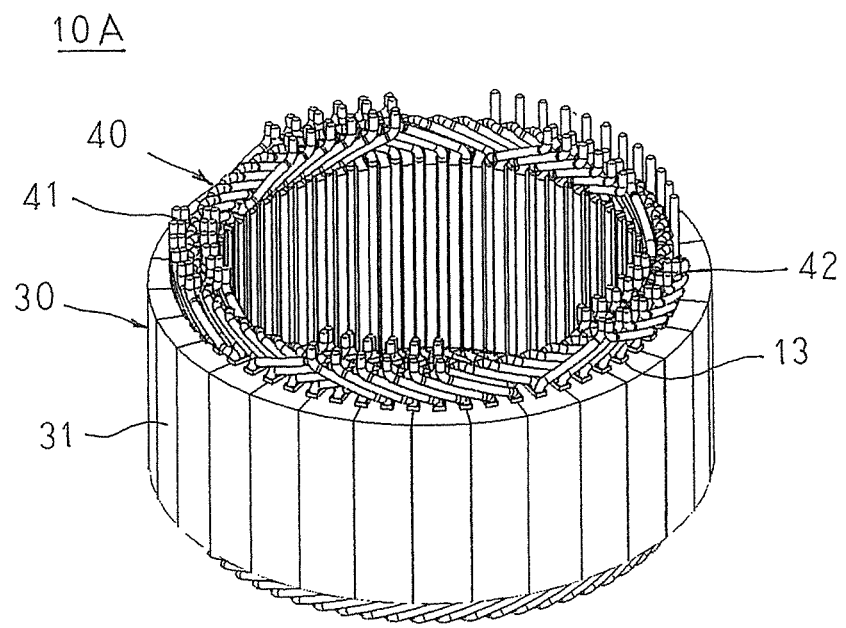
FIG. 24 is an oblique projection that shows an armature that is used in an rotary electric machine according to Embodiment 5 of the present invention.
Figure 25:
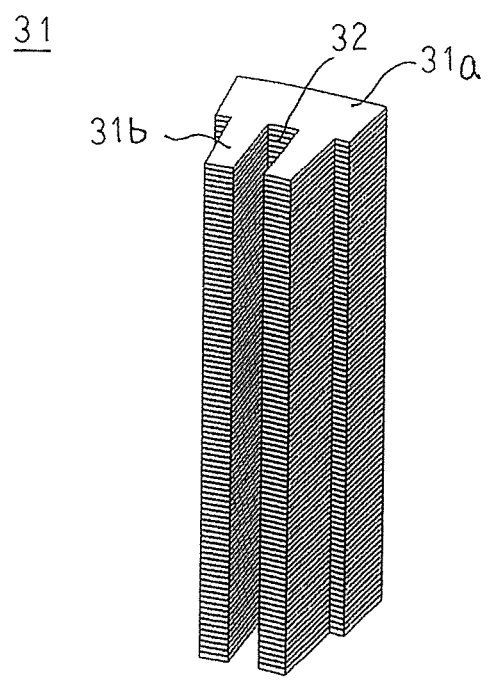
FIG. 25 is an oblique projection that shows a core block that constitutes part of the armature that is used in the rotary electric machine according to Embodiment 5 of the present invention.
Figure 26:
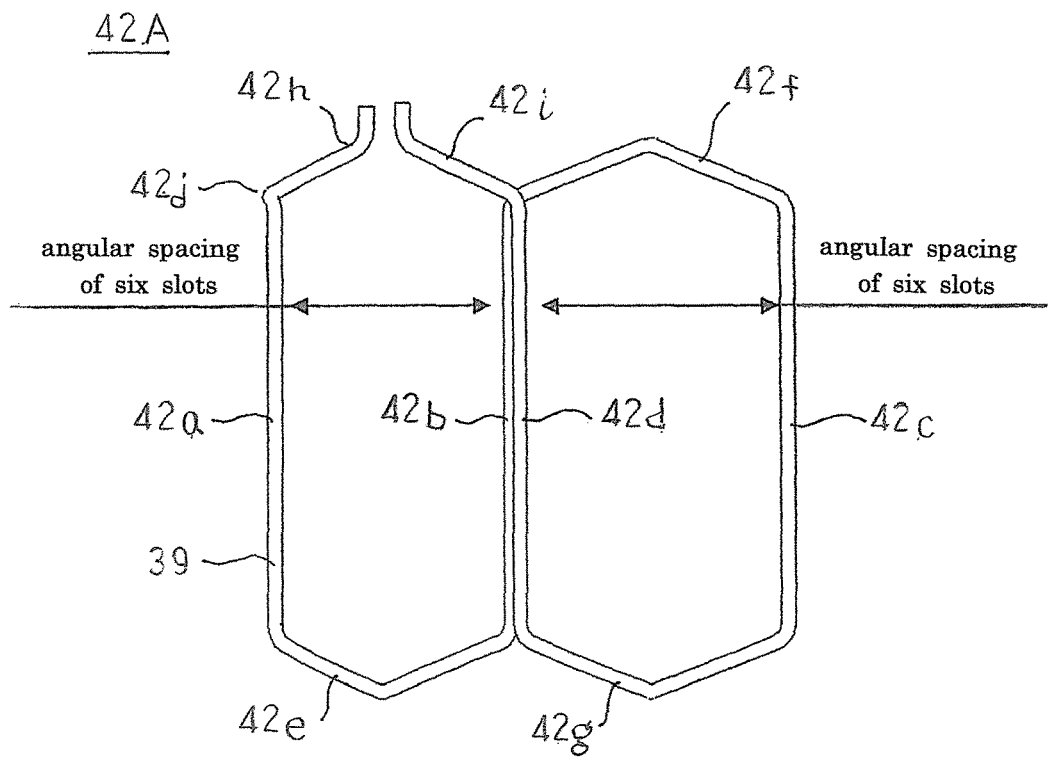
FIG. 26 is a front elevation that shows a first winding body that constitutes part of an armature winding in the rotary electric machine according to Embodiment 5 of the present invention.
Figure 27:
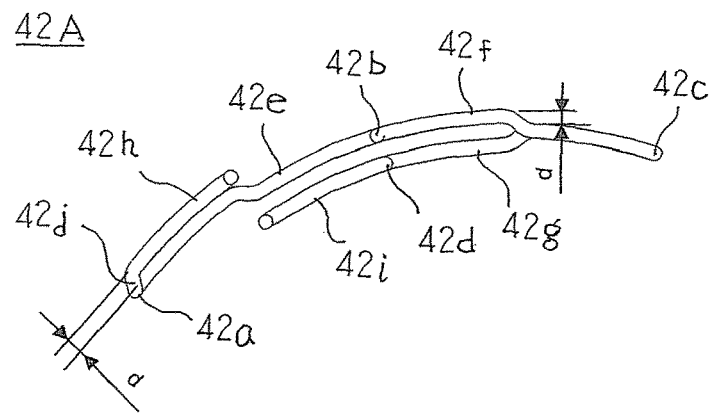
FIG. 27 is a plan that shows the first winding body that constitutes part of the armature winding in the rotary electric machine according to Embodiment 5 of the present invention.
Figure 28:
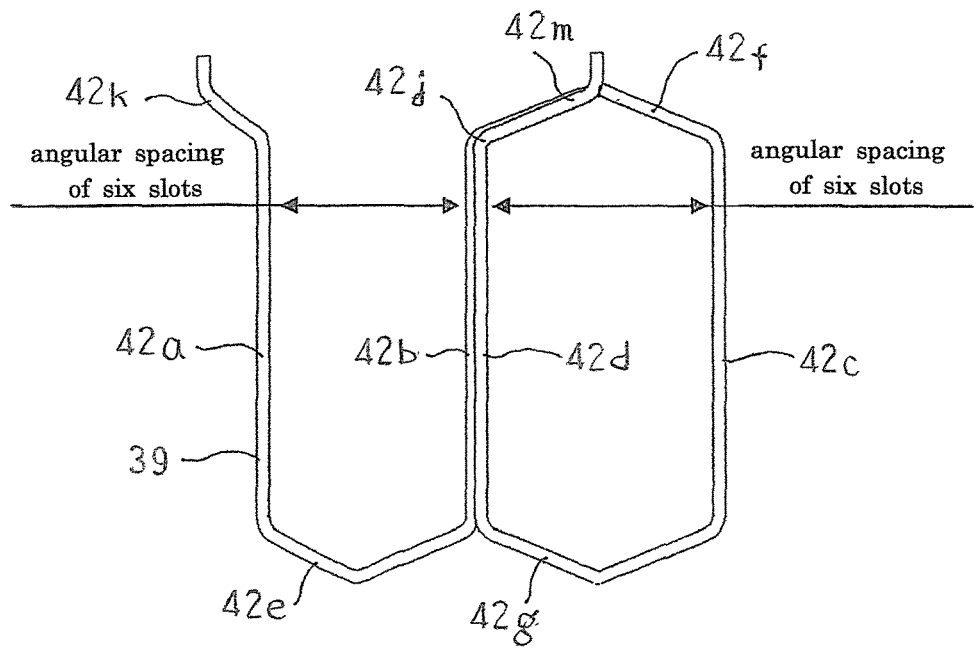
FIG. 28 is a front elevation that shows a second winding body that constitutes part of the armature winding in the rotary electric machine according to Embodiment 5 of the present invention.
Figure 29:
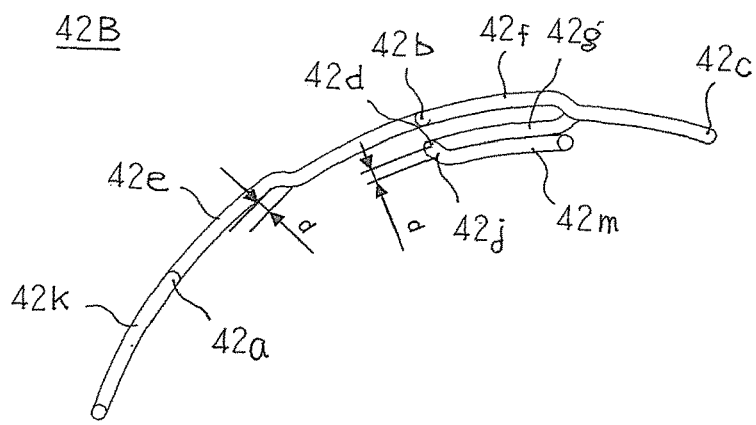
FIG. 29 is a plan that shows the second winding body that constitutes part of the armature winding in the rotary electric machine according to Embodiment 5 of the present invention.
Figure 30:
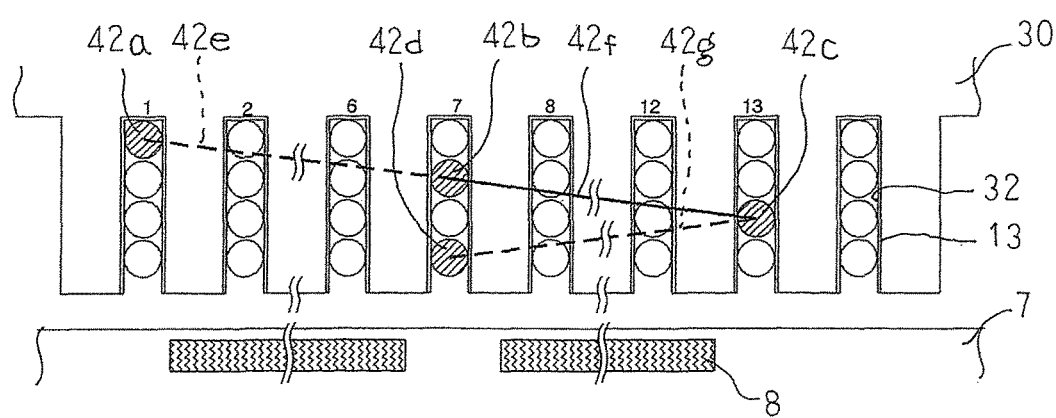
FIG. 30 is a partial cross section that schematically shows a slot-housed state of the winding bodies in the rotary electric machine according to Embodiment 5.
Figure 31:
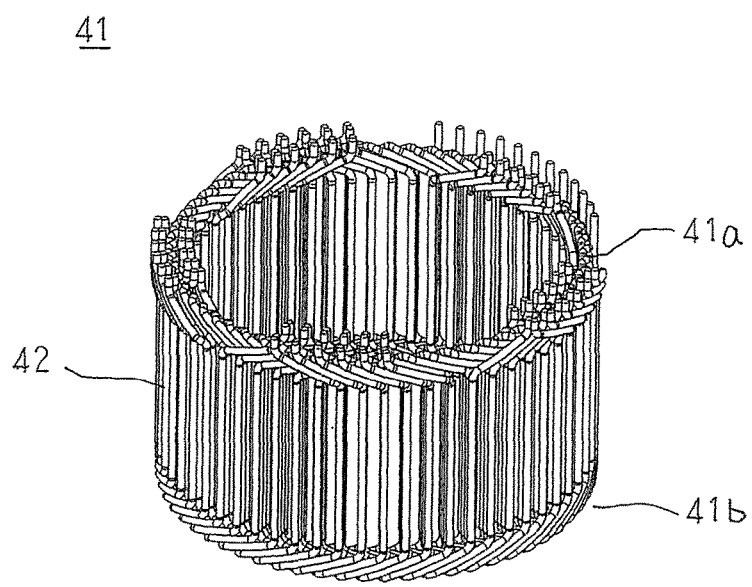
FIG. 31 is an oblique projection that shows a winding assembly that constitutes part of the armature winding in the rotary electric machine stator according to Embodiment 5 of the present invention.

FIG. 24 is an oblique projection that shows an armature that is used in an rotary electric machine according to Embodiment 5 of the present invention, FIG. 25 is an oblique projection that shows a core block that constitutes part of the armature that is used in the rotary electric machine according to Embodiment 5 of the present invention, FIG. 26 is a front elevation that shows a first winding body that constitutes part of an armature winding in the rotary electric machine according to Embodiment 5 of the present invention, FIG. 27 is a plan that shows the first winding body that constitutes part of the armature winding in the rotary electric machine according to Embodiment 5 of the present invention, FIG. 28 is a front elevation that shows a second winding body that constitutes part of the armature winding in the rotary electric machine according to Embodiment 5 of the present invention, FIG. 29 is a plan that shows the second winding body that constitutes part of the armature winding in the rotary electric machine according to Embodiment 5 of the present invention, FIG. 30 is a partial cross section that schematically shows a slot-housed state of the winding bodies in the rotary electric machine according to Embodiment 5, and FIG. 31 is an oblique projection that shows a winding assembly that constitutes part of the armature winding in the rotary electric machine stator according to Embodiment 5 of the present invention.

In FIG. 24, an armature 10A includes: an annular armature core 30; an armature winding 40 that is mounted to the armature core 30; and slot cells 13 that electrically isolate the armature winding 40 and the armature core 30. Here, to facilitate explanation, the number of poles is ten poles, the number of slots in the armature core 30 is sixty, and the armature winding 40 is a three-phase winding. In other words, the slots are formed on the armature core 30 at a ratio of two slots per phase per pole.

As shown in FIG. 25, core blocks 31 are made by dividing the annular armature core 30 into thirty equal sections circumferentially, and include: a core back portion 31a that has a circular arc-shaped cross section, that is produced by laminating and integrating a plurality of electromagnetic steel sheets; and two teeth 31*b* that are disposed so as to protrude radially inward from an inner circumferential wall surface of the core back portion 31*a*. The armature core 30 is configured into an annular shape by arranging and integrating thirty core blocks 31 circumferentially by butting together circumferential side surfaces of the core back portions 31*a* such that the teeth 31*b* are oriented radially inward. The slots 32, which are formed by circumferentially adjacent core blocks 31, are arranged at a uniform angular pitch circumferentially so as to be open on an inner circumferential side. The teeth 31*b* are formed so as to have a tapered shape in which a circumferential width becomes gradually narrower radially inward, and a cross section of the slots 32 that is perpendicular to an axial direction of the armature core 30 is oblong. Thus, the armature core 30 is configured in a similar manner to the above-mentioned armature core 11 except that the thirty core blocks 31 are arranged circumferentially to form the annular shape.

Winding bodies 42 that constitute part of the armature winding 40 are constituted by first winding bodies 42A and second winding bodies 42B in which directions in which terminals extend are different. The first winding bodies 42A and the second winding bodies 42B are produced by winding a conductor wire 39 that has a circular cross section that has a diameter d, that is made of jointless continuous copper wire or aluminum wire that is coated with an insulating enamel resin, for example, into a first slot, a second slot, and a third slot that line up at an angular spacing of six slots circumferentially, in a δ-shaped coil pattern that is formed by inserting the conductor wire 39 so as to alternate an axial direction of insertion into the first slot, the second slot, and the third slot, sequentially in order of the first slot, the second slot, the third slot, and the second slot. Moreover, the winding bodies 42 may be produced using a conductor wire that has an oblong cross section instead of the conductor wire 39 that has a circular cross section.

As shown in FIGS. 26 and 27, the first winding bodies 42A include: first, second, third, and fourth rectilinear portions 42*a*, 42*b*, 42*c*, and 42*d* that form three rows so as to be at an angular spacing of six slots apart; a first coil end portion 42*e* that links first longitudinal ends of the first and second rectilinear portions 42*a* and 42*b* to each other; a second coil end portion 42*f* that links second longitudinal ends of the second and third rectilinear portions 42*b* and 42*c* to each other; a third coil end portion 42*g* that links first longitudinal ends of the third and fourth rectilinear portions 42*c* and 42*d* to each other; a radially outer terminal 42*h* that constitutes a second conductor terminal that extends from a second longitudinal end of the first rectilinear portion 42*a*; and a radially inner terminal 42*i* that constitutes a first conductor terminal that extends from a second longitudinal end of the fourth rectilinear portion 42*d*. Moreover, an angular spacing of six slots corresponds to a pitch of one magnetic pole.

Specifically, as shown in FIG. 30, the winding bodies 42A are produced into a δ-shaped coil pattern in which a conductor wire 39 is inserted into a first layer inside the slots 32 at Slot Number 1 from near a first axial end of the armature core 30, extends outward from the slots 32 at Slot Number 1 at a second axial end of the armature core 30, is inserted into a second layer inside the slots 32 at Slot Number 7, which is separated by an angular spacing of six slots in a first circumferential direction, extends outward from the slots 32 at Slot Number 7 at a second axial end of the armature core 30, is inserted into a third layer inside the slots 32 at Slot Number 13, which is separated by an angular spacing of six slots in the first circumferential direction, extends outward from the slots 32 at Slot Number 13 at the second axial end of the armature core 30, is inserted into a fourth layer inside the slots 32 at Slot Number 7, which is separated by an angular spacing of six slots in the second circumferential direction, and extends outward from the slots 32 at Slot Number 7 at the first axial end of the armature core 30.

Here, housed positions of the conductor wire 39 that is housed inside the slots 32 are designated a first layer, a second layer, a third layer, and a fourth layer from radially outside for simplicity. In FIG. 30, "1", "2", etc., through "12", and "13" are slot numbers that are allotted to the slots 32 sequentially in a circumferential direction.

The first rectilinear portion 42*a* is housed in the first layer inside the slots 32 at Slot Number 1, the second and fourth rectilinear portions 42*b* and 42*d* are housed in the second layer and the fourth layer inside the slots 32 at Slot Number 7, and the third rectilinear portion 42*c* is housed in the third layer inside the slots 32 at Slot Number 13. In other words, the first, second, third, and fourth rectilinear portions 42*a*, 42*b*, 42*c*, and 42*d* are arranged in three columns so as to be separated by an angular spacing of six slots.

The first coil end portion 42*e* that extends outward at the second axial end of the armature core 30 from the first layer inside the slots 32 at Slot Number 1 maintains its radial position and extends at a constant inclination in the first circumferential direction and axially outward, is displaced by d radially inward at a central portion (a top portion), and subsequently maintains its radial position and extends at a reverse inclination in the first circumferential direction and axially inward to enter the second layer inside the slots 32 at Slot Number 7.

The second coil end portion 42*f* that extends outward at the first axial end of the armature core 30 from the second layer inside the slots 32 at Slot Number 7 maintains its radial position and extends at a constant inclination in the first circumferential direction and axially outward, is displaced by d radially inward at a central portion (a top portion), and subsequently maintains its radial position and extends at a reverse inclination in the first circumferential direction and axially inward to enter the third layer inside the slots 32 at Slot Number 13.

The third coil end portion 42*g* that extends outward at the second axial end of the armature core 30 from the third layer inside the slots 32 at Slot Number 13 maintains its radial position and extends at a constant inclination in the second circumferential direction and axially outward, is displaced by d radially inward at a central portion (a top portion), and subsequently maintains its radial position and extends at a reverse inclination in the second circumferential direction and axially inward to enter the fourth layer inside the slots 32 at Slot Number 7.

Thus, the first through third coil ends 42*e*, 42*f*, and 42*g* have crank portions that displace radially by the radial width d of the conductor wires 39 at the top portions.

As shown in FIGS. 26 and 27, the radially outer terminal 42*h* that extends from the first layer inside the slots 32 at Slot Number 1 at the first axial end of the armature core 30 is bent at the displacing portion 42*j* so as to be displaced radially outward by d, and subsequently maintains its radial position, extends in the first circumferential direction and axially outward at a constant inclination, and is bent at a central portion (a top portion) to project radially outward.

As shown in FIGS. 26 and 27, the radially inner terminal 42*i* that extends from the fourth layer inside the slots 32 at Slot Number 7 at the first axial end of the armature core 30 maintains its radial position, extends in the second circumferential direction and axially outward at a constant inclination, and is bent at a central portion (a top portion) to project radially outward.

As shown in FIGS. 28 and 29, second winding bodies 42B include: first, second, third, and fourth rectilinear portions 42a, 42b, 42c, and 42d that form three rows so as to be at an angular spacing of six slots apart; a first coil end portion 42e that links first longitudinal ends of the first and second rectilinear portions 42a and 42b to each other; a second coil end portion 42f that links second longitudinal ends of the second and third rectilinear portions 42b and 42c to each other; a third coil end portion 42g that links first longitudinal ends of the third and fourth rectilinear portions 42c and 42d to each other; a radially outer terminal 42k that constitutes a second conductor terminal that extends from a second longitudinal end of the first rectilinear portion 42a; and a radially inner terminal 42m that constitutes a first conductor terminal that extends from a second longitudinal end of the fourth rectilinear portion 42d, and are produced into a δ-shaped coil pattern. In other words, the second winding bodies 42B are configured in a similar manner to the first winding bodies 42A except for the radially outer terminals 42k and the radially inner terminals 42m.

In this second winding body 42B, the first rectilinear portion 42a is housed in the first layer inside the slots 32 at Slot Number 1, the second and fourth rectilinear portions 42b and 42d are housed in the second layer and the fourth layer inside the slots 32 at Slot Number 7, and the third rectilinear portion 42c is housed in the third layer inside the slots 32 at Slot Number 13, in a similar manner to the first winding bodies 42A.

As shown in FIGS. 28 and 29, the radially outer terminal 42k that extends from the first layer inside the slots 32 at Slot Number 1 at the first axial end of the armature core 30 maintains its radial position, extends in the second circumferential direction and axially outward at a constant inclination, and is bent at a central portion (a top portion) to project radially outward.

As shown in FIGS. 28 and 29, the radially inner terminal 42m that extends from the fourth layer inside the slots 32 at Slot Number 7 at the first axial end of the armature core 30 is bent at the displacing portion 42j so as to be displaced radially inward by d, and subsequently maintains its radial position, extends in the first circumferential direction and axially outward at a constant inclination, and is bent at a central portion (a top portion) to project radially outward.

First winding bodies 42A and second winding bodies 42B that have been produced in this manner are arranged so as to alternate six at a time in a circumferential direction at a pitch of one slot to produce the annular winding assembly 41 that is shown in FIG. 31. This winding assembly 41 is constituted by thirty first winding bodies 42A and thirty second winding bodies 42B.

In the winding assembly 41 that is produced in this manner, first, second, third, and fourth rectilinear portions 42a, 42b, 42c, and 42d are lined up in single columns in a radial direction, and sixty columns are arranged circumferentially at pitch of one slot.

At a first axial end of this winding assembly 41, a second coil end row that is configured by arranging the second coil ends 42f at a pitch of one slot circumferentially constitutes a first coil end group 41a. At a second axial end of this winding assembly 41, a first coil end row that is configured by arranging the first coil ends 42e at a pitch of one slot circumferentially and a third coil end row that is configured by arranging the third coil ends 42g at a pitch of one slot circumferentially are lined up in two layers in a radial direction to constitute a second coil end group 41b.

In addition, four sets of terminal pairs in which six pairs of end portions of radially outer terminals 42h and 42k of the first winding bodies 42A and the second winding bodies 42B that are separated by 180 electrical degrees are arranged at a pitch of one slot in a circumferential direction so as to be stacked in a radial direction are formed so as to be separated in a circumferential direction on a radially outer side of the first coil end group 41a. Furthermore, five sets of terminal pairs in which six pairs of end portions of radially inner terminals 42i and 42m of the first winding bodies 42A and the second winding bodies 42B that are separated by 180 electrical degrees are arranged at a pitch of one slot in a circumferential direction so as to be stacked in a radial direction are formed so as to be separated in a circumferential direction on a radially inner side of the first coil end group 41a.

Figure 32:
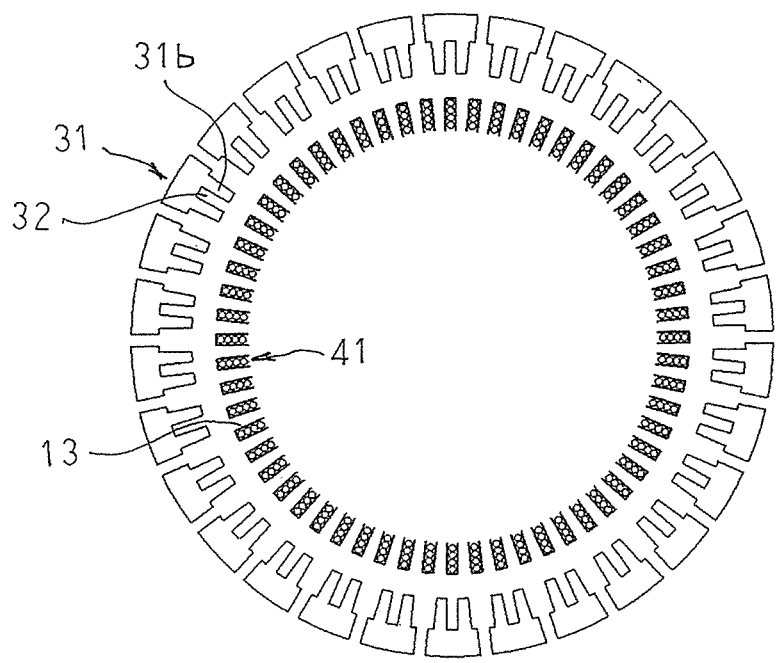
FIG. 32 is a diagram that explains a method for assembling the armature in the rotary electric machine according to Embodiment 5 of the present invention.
Figure 33:
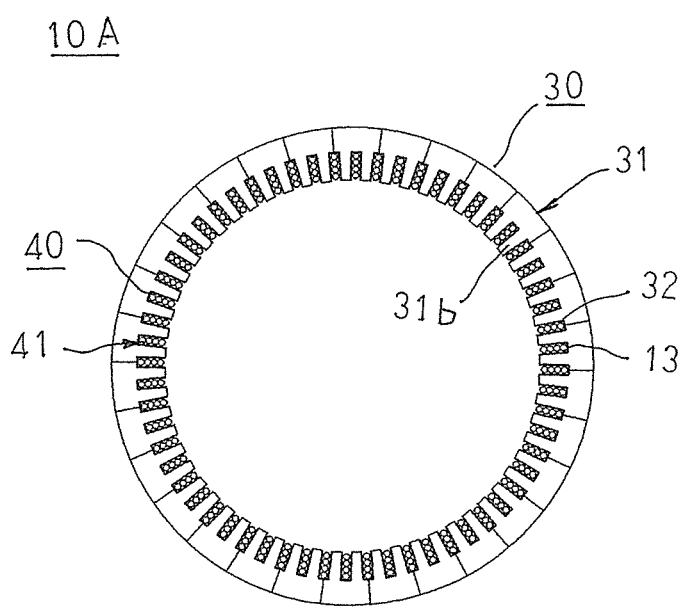
FIG. 33 is a diagram that explains the method for assembling the armature in the rotary electric machine according to Embodiment 5 of the present invention.

Next, a method for assembling an armature 10A will be explained with reference to FIGS. 32 and 33. FIGS. 32 and 33 are diagrams that explain a method for assembling the armature in the rotary electric machine according to Embodiment 5 of the present invention, FIG. 32 showing a state before armature assembly, and FIG. 33 showing a state after armature assembly.

The slot cells 13 are first mounted onto each of the columns of the first through fourth rectilinear portions 42a, 42b, 42c, and 42d of the winding assembly 41. Next, thirty core blocks 31 are arranged at an approximately uniform angular pitch circumferentially such that respective teeth 31b are positioned on a radially outer side between adjacent columns of first through fourth rectilinear portions 42a, 42b, 42c, and 42d of the winding assembly 41, as shown in FIG. 32. Next, the core blocks 31 that are arranged circumferentially are moved radially inward. The respective teeth 31b of the core blocks 31 are thereby inserted between the adjacent columns of first through fourth rectilinear portions 42a, 42b, 42c, and 42d.

Then, when the core blocks 31 that are arranged circumferentially are moved further radially inward, the circumferential side surfaces of the adjacent core blocks 31 butt together, preventing radially inward movement of the core blocks 31. The winding assembly 41 is thereby mounted to the armature core 30, as shown in FIG. 33. Next, insulating sheets 16 are inserted between the radially outer terminals 42h and 42k and between the radially inner terminals 42i and 42m that are stacked in a radial direction. Next, a connection process is applied to the winding assembly 41 in a similar or identical manner to that of Embodiment 1 above, to assemble the armature 10A.

Moreover, although not shown, a distance in the radially outer terminals 42k from an end surface of the armature core 30 to a bending starting position (a circumferential bending position) is longer than a distance in the radially outer terminals 42h from the end surface of the armature core 30 to a bending starting position (a circumferential bending position) of the displacing portion 42j. A distance in the radially inner terminals 42i from an end surface of the armature core 30 to a bending starting position (a circumferential bending position) is longer than a distance in the radially inner terminals 42m from the end surface of the armature core 30 to a bending starting position (a circumferential bending position) of the displacing portion 42j.

In Embodiment 5, winding bodies 42 that are distributed windings that are equal in number to the total number of slots are mounted to an armature core 30 at a pitch of one slot. The winding bodies 42 are configured such that radially inner terminals 42*i* and 42*m* that are first ends of conductor wires 39 extend outward at a first axial end of the armature core 30 from radially innermost positions in slots 32, and radially outer terminals 42*h* and 42*k* that are second ends of the conductor wires 39 extend outward at the first axial end of the armature core 30 from radially outermost positions in the slots 32. In addition, respective phase windings of the armature winding 40 are configured by directly joining together the radially inner terminals 42*i* and 42*m* of the winding bodies 42 that constitute identical phases, and by directly joining together the radially outer terminals 42*h* and 42*k*.

Consequently, in Embodiment 5, it is also not necessary to pass the radially inner terminals 42*i* and 42*m* and the radially outer terminals 42*h* and 42*k* axially outside the first coil end group 41*a*, enabling axial dimensions of the armature 10A to be reduced.

Separate parts such as busbars for connecting the terminals of the winding bodies 42 to each other are also no longer required, enabling the number of parts in the armature 10A to be reduced.

The radially inner terminals 42*i* of first winding bodies 42A are kept aligned with a fourth radial position from radially outside inside the slots 32, and the radially outer terminals 42*f* are displaced by the width d of the conductor wire 39 radially outward from a first radial position from radially outside inside the slots 32. The radially inner terminals 42*m* of the second winding bodies 42B are displaced by a width d of the conductor wire 19 radially inward from the fourth radial position from radially outside inside the slots 32, and the radially outer terminals 42*k* are kept aligned with the first radial position from radially outside inside the slots 32. Thus, the radially inner terminals 42*i* can be led around in a circumferential direction and joined to the corresponding radially inner terminals 42*m* without being interfered with by the radially inner terminals 42*m*. The radially outer terminals 42*h* can also be led around in a circumferential direction and joined to the corresponding radially outer terminals 42*k* without being interfered with by the radially outer terminals 42*k*. Consequently, radial bulging of the second coil end group 41*a* can be reduced.

Moreover, in Embodiment 5 above, the winding bodies 42 are produced by continuously winding conductor wires 39 into a δ-shaped coil pattern for one turn, but winding bodies may be produced by winding conductor wires 39 into a δ-shaped coil pattern for two or more turns. In other words, winding bodies may be configured in series by arranging the δ-shaped coil patterns (winding bodies 42) in two or more layers in a radial direction, and linking together winding ends of three δ-shaped coil patterns using crossover wires.

In each of the above embodiments, cases in which a rotary electric machine has been applied to an electric motor have been explained, but similar or identical effects are also exhibited if the rotary electric machine is applied to a generator.

In each of the above embodiments, a ten-pole, sixty-slot rotary electric machine has been explained, but the number of poles p and the number of slots S are not limited to ten poles and sixty slots.

In each of the above embodiments, slots are formed at a ratio of two slots per phase per pole, but the number of slots per phase per pole q is not limited to two, and may be one, or may be three or greater. If the number of slots per phase per pole is one, for example, then the spacing between the columns of first rectilinear portions and second rectilinear portions of the winding bodies will be an angular spacing of three slots (a pitch of one magnetic pole).

In each of the above embodiments, the winding bodies are formed into full-pitch windings, but the winding bodies may be configured into short-pitch windings or long-pitch windings.

The invention claimed is:

1. A rotary electric machine comprising an armature that comprises:
  an annular armature core in which slots are arranged circumferentially; and
  an armature winding that is mounted to said armature core,
  wherein:
  said armature winding is configured by mounting to said armature core at a pitch of one slot in a circumferential direction distributed winding bodies that are each produced by winding a jointless, continuous conductor wire that is coated with insulation for a plurality of turns, said winding bodies being equal in number to a total number of said slots;
  said winding bodies are configured such that a first conductor terminal of said conductor wire extends outward at a first axial end of said armature core from a radially innermost position inside said slots, and a second conductor terminal of said conductor wire extends outward at said first axial end of said armature core from a radially outermost position inside said slots; and
  respective phase windings of said armature winding are configured by directly joining together said first conductor terminals and by directly joining together said second conductor terminals of said winding bodies that constitute identical phases,
  wherein:
  a first of said first conductor terminals that are joined together is bent after emerging from said slots so as to extend in a first circumferential direction, a second of said first conductor terminals that are joined together is bent after emerging from said slots so as to extend in a second circumferential direction, and end portions of said first conductor terminals are joined together; and
  a first of said second conductor terminals that are joined together is bent after emerging from said slots so as to extend in said second circumferential direction, a second of said second conductor terminals that are joined together is bent after emerging from said slots so as to extend in said first circumferential direction, and end portions of said second conductor terminals are joined together,
  wherein:
  said first of said first conductor terminals is bent after emerging from said slots so as to extend in said first circumferential direction such that a radial position thereof remains aligned with said radially innermost position inside said slots, and said second of said first conductor terminals is bent after emerging from said slots so as to extend in said second circumferential direction such that a radial position thereof remains aligned with a position that is displaced by a radial width of said conductor wire radially inward from said radially innermost position inside said slots; and
  said first of said second conductor terminals is bent after emerging from said slots so as to extend in said second circumferential direction such that a radial position thereof remains aligned with said radially outermost position inside said slots, and said second of said second conductor terminals is bent after emerging from said slots so as to extend in said first circumferential direction such that a radial position thereof remains aligned with a position that is displaced by a radial width of said conductor wire radially outward from said radially outermost position inside said slots.

2. The rotary electric machine according to claim 1, wherein:
a circumferential bending position of said first of said first conductor terminals that are bent after emerging from said slots is further away from an end surface of said armature core than a circumferential bending position of said second of said first conductor terminals that are bent after emerging from said slots; and
a circumferential bending position of said first of said second conductor terminals that are bent after emerging from said slots is further away from an end surface of said armature core than a circumferential bending position of said second of said second conductor terminals that are bent after emerging from said slots.

3. The rotary electric machine according to claim 2, wherein insulating sheets are disposed between said first conductor terminals that have different phases and between said second conductor terminals that have different phases that cross each other when viewed from a radial direction.

4. The rotary electric machine according to claim 1, wherein said first conductor terminals are inclined radially inward such that joint portions between said first conductor terminals are separated radially inward from a coil end group of said armature winding, and said second conductor terminals are inclined radially outward such that joint portions between said second conductor terminals are separated radially outward from said coil end group of said armature winding.

5. The rotary electric machine according to claim 4, wherein insulating sheets are disposed between said first conductor terminals that have different phases and between said second conductor terminals that have different phases that cross each other when viewed from a radial direction.

6. The rotary electric machine according to claim 1, wherein insulating sheets are disposed between said first conductor terminals that have different phases and between said second conductor terminals that have different phases that cross each other when viewed from a radial direction.

* * * * *